(12) United States Patent
Kim et al.

(10) Patent No.: US 12,218,542 B2
(45) Date of Patent: Feb. 4, 2025

(54) VOLTAGE REGULATOR FOR COMPUTING DEVICE

(71) Applicant: Microsoft Technology Licensing, LLC, Redmond, WA (US)

(72) Inventors: Donghwi Kim, Kirkland, WA (US); Gregory Allen Nielsen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/601,081

(22) Filed: Mar. 11, 2024

(65) Prior Publication Data

US 2024/0213793 A1    Jun. 27, 2024

Related U.S. Application Data

(63) Continuation of application No. 17/454,754, filed on Nov. 12, 2021, now Pat. No. 11,936,230.

(60) Provisional application No. 63/261,010, filed on Sep. 8, 2021.

(51) Int. Cl.
| | |
|---|---|
| *H02J 7/00* | (2006.01) |
| *G06F 1/26* | (2006.01) |
| *G06F 1/28* | (2006.01) |
| *G06F 1/3212* | (2019.01) |
| *G06F 1/3234* | (2019.01) |
| *G06F 1/324* | (2019.01) |
| *G06F 1/3296* | (2019.01) |

(52) U.S. Cl.
CPC ............ *H02J 7/00714* (2020.01); *G06F 1/28* (2013.01); *H02J 7/0029* (2013.01); *H02J 7/0047* (2013.01); *H02J 7/0063* (2013.01); *H02J 2207/20* (2020.01)

(58) Field of Classification Search
CPC .... H02J 7/00714; H02J 7/0029; H02J 7/0047; H02J 7/0063; G06F 1/28
See application file for complete search history.

(56) References Cited

U.S. PATENT DOCUMENTS

| | | | | |
|---|---|---|---|---|
| 2004/0236969 | A1* | 11/2004 | Lippert ................. | G06F 1/30 713/300 |
| 2011/0128076 | A1* | 6/2011 | Mills .................... | H03F 3/24 330/207 P |
| 2016/0291680 | A1* | 10/2016 | Ma ...................... | G06F 1/3253 |

* cited by examiner

*Primary Examiner* — Jaweed A Abbaszadeh
*Assistant Examiner* — Gayathri Sampath
(74) *Attorney, Agent, or Firm* — Alleman Hall & Tuttle LLP

(57) ABSTRACT

A computing device is provided, including a battery, a processor configured to receive electrical power from the battery via a voltage regulator, and one or more additional electronic components configured to receive electrical power from the battery. The computing device may further include a first current detector configured to detect a total battery discharge current. The voltage regulator may be configured to receive a first analog current signal from the first current detector, convert the first analog current signal into first digital current data, and transmit the first digital current data to the processor. The processor may be further configured to determine a difference between the total battery discharge current and an available electric current limit for the battery. In response to at least determining the difference, the processor may be further configured to adjust one or more performance parameters of the processor such that the difference is reduced.

20 Claims, 16 Drawing Sheets

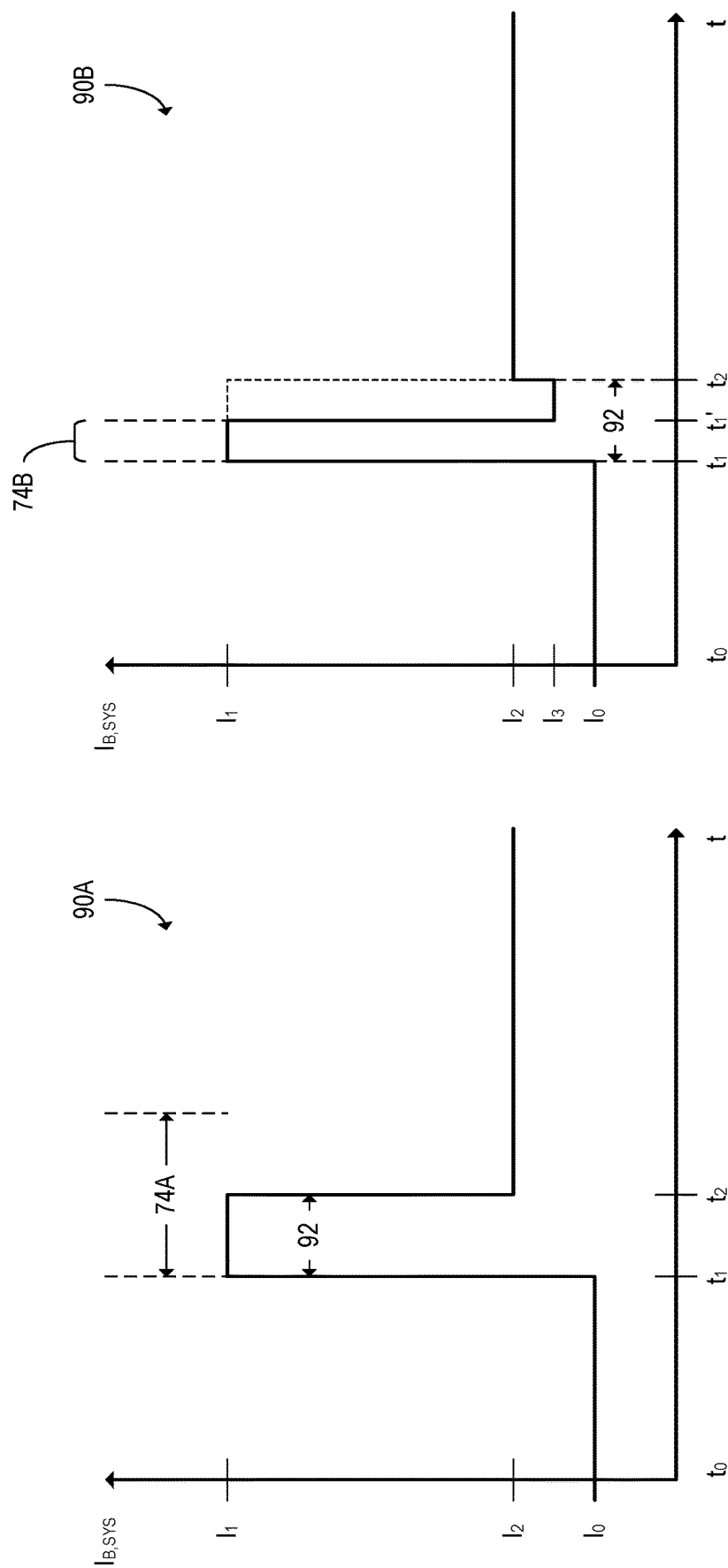

VOLTAGE REGULATOR FOR COMPUTING DEVICE

CROSS REFERENCE TO RELATED APPLICATIONS

This application is a continuation of U.S. Non-Provisional patent application Ser. No. 17/454,754, filed Nov. 12, 2021, which claims priority to U.S. Provisional Patent Application Ser. No. 63/261,010, filed Sep. 8, 2021, the entirety of each of which is hereby incorporated herein by reference for all purposes.

BACKGROUND

A mobile computing device typically includes a battery that is configured to power electronic components of the mobile computing device and that is rechargeable using a power supply unit (PSU). The amount of electric current supplied by the battery during operation of the mobile computing device may vary during device operation. In particular, changes in levels of processor utilization at the mobile computing device may result in large changes in the amount of electric current drawn from the battery.

SUMMARY

According to one aspect of the present disclosure, a computing device is provided, including a battery, a processor configured to receive electrical power from the battery via a voltage regulator, and one or more additional electronic components configured to receive electrical power from the battery. The computing device may further include a first current detector configured to detect a total battery discharge current flowing from the battery to the processor via the voltage regulator and to the one or more additional electronic components. The voltage regulator may be configured to receive a first analog current signal from the first current detector, convert the first analog current signal into first digital current data, and transmit the first digital current data to the processor. The processor may be further configured to determine a difference between the total battery discharge current, as indicated by the first digital current data, and an available electric current limit for the battery. In response to at least determining the difference between the total battery discharge current and the available electric current limit, the processor may be further configured to adjust one or more performance parameters of the processor such that the difference is reduced.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A-7B show a first prophetic example plot and a second prophetic example plot of the electric current received at the system from the battery as a function of time when the voltage regulator includes a deglitching circuit, according to the example of FIG. 2.

DETAILED DESCRIPTION

In existing mobile computing devices, when the processor operates at a high level of power consumption, the battery may output larger amounts of electric current than the battery is designed to support. This rapid discharging may result in degradation of the battery and unreliable battery performance. The discharge rate of the battery is typically managed using a current control algorithm executed at the processor. The current control algorithm typically uses, as its inputs, measurements of the discharge rate of the battery sampled over a predefined time window. However, such a current control algorithm may respond slowly to rapid increases in current, thereby allowing the processor to draw amounts of electric current that may degrade the performance of the battery. In addition, software-based current control algorithms may be vulnerable to software malfunctions, which could cause undesirable delays or suspend operation of the control algorithm.

Figure 1:
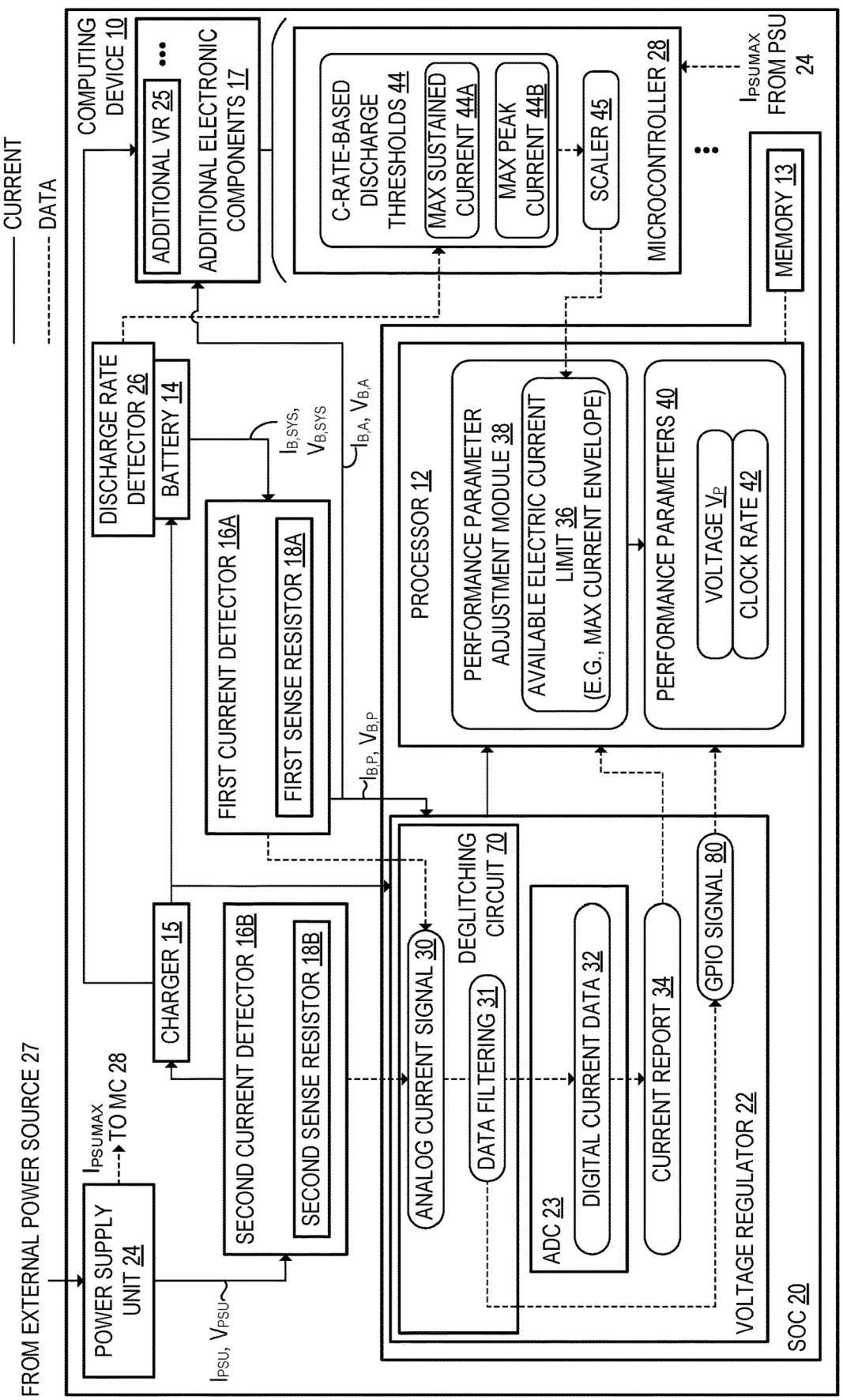
FIG. 1 schematically shows an example computing device including a processor, memory, a battery, a first current detector, a second current detector, a power supply unit, a discharge rate detector, and a microcontroller, according to one example embodiment.

In order to address the challenges discussed above, a computing device 10 is provided, as shown in FIG. 1 according to one example embodiment. The computing device 10 may be a mobile computing device such as a smartphone, a tablet, a laptop computer, a portable video game system, or some other type of mobile computing device. The computing device 10 may include a battery 14 configured to store electric charge and to provide electrical power to other components of the computing device 10. The computing device 10 may further include a processor 12 and memory 13 that are configured to receive electrical power from the battery 14. The processor 12 and memory 13 may be communicatively coupled by a data bus. In some examples, as depicted in FIG. 1, the processor 12 and/or the memory 13 may be included in a system-on-a-chip (SoC) 20.

When the processor 12 receives electrical power from the battery 14, the processor 12 may be configured to receive the electrical power via a voltage regulator 22. The voltage regulator 22 may be included in the SoC 20, as depicted in the example of FIG. 1. In other examples in which the processor 12 is not included in an SoC 20, the voltage regulator 22 may be provided in another physical component of the computing device 10. As discussed in further detail below, the voltage regulator 22 may be configured to transmit electric current data to the processor 12. The voltage regulator 22 may be configured to receive an analog current signal 30 at an analog-to-digital converter (ADC) 23 and to generate digital current data 32 from the analog current signal 30. The voltage regulator 22 may be further configured to transmit the digital current data 32 to the processor 12 in a current report 34 that may be utilized at the processor 12 to adjust the amount of electric current drawn by the processor 12.

The computing device 10 may further include a power supply unit (PSU) 24 configured to supply electrical power to the computing device 10. The PSU 24 may be configured to supply conditioned electrical power to the battery 14 and to one or more additional electronic components 17 of the computing device 10 while the PSU 24 is electrically coupled to an external power source 27. The PSU 24 may be configured to convert an alternating current (AC) input supplied by the electrical power source to a direct current (DC) output supplied to the battery 14 and one or more additional electronic components 17 of the computing device 10. The PSU 24 may be further configured to transform an input voltage supplied by the electrical power source into an output voltage that is suitable for charging the battery 14 and operating the computing device 10. The PSU 24 may be detachably coupled to the computing device 10 such that the computing device 10 may be used in a mobile configuration in which the electronic components of the computing device 10 receive electrical power from the battery 14 and are not coupled to the external power source 27. The computing device 10 may further include a charger 15 configured to receive electrical power from the PSU 24 and to transmit that electrical power to the battery 14 and the voltage regulator 22.

In addition to the processor 12, the memory 13, the battery 14, the voltage regulator 22, the PSU 24, and the charger 15, the computing device 10 may further include one or more additional electronic components 17, as discussed above. The one or more additional electronic components 17 may be configured to receive electrical power from the battery 14. The one or more additional electronic components 17 may also be configured to receive electrical power from the PSU 24 when the PSU 24 is connected to the external power source 27. At least one of, and typically each of, the one or more additional electronic components 17 may have a respective additional voltage regulator 25 configured to receive electric current flowing to that additional electronic component 17.

In some examples, as shown in FIG. 1, the one or more additional electronic components 17 may include a discharge rate detector 26 that is configured to measure a discharge C-rate 44 of the battery 14. The C-rate of the battery 14 is the rate at which the battery 14 is charged or discharged, expressed as a proportion of the full capacity of the battery 14 that is charged or discharged per hour. The charge C-rate is the C-rate of the battery 14 when the battery 14 is charging, and the discharge C-rate 44 is the C-rate when the battery 14 is discharging. In some examples, the discharge rate detector 26 may be provided within the battery 14.

The one or more additional electronic components 17 included in the computing device 10 may further include a microcontroller 28. In examples in which the processor 12, the memory 13, and the voltage regulator 22 are included in an SoC 20, the microcontroller 28 may be included in the computing device 10 as a separate component from the SoC 20. The microcontroller 28 may be coupled to the processor 12 by a data bus and may be configured to control one or more settings of the processor 12, as discussed in further detail below. In examples in which the computing device 10 includes a discharge rate detector 26, the microcontroller 28 may be configured to receive C-rate threshold data from the discharge rate detector 26, as discussed in further detail below.

As shown in the example of FIG. 1, the computing device 10 may further include a first current detector 16A configured to detect a total battery discharge current $I_{B,SYS}$ flowing from the battery 14 to the processor 12 via the voltage regulator 22 and to the one or more additional electronic components 17. The first current detector 16A may be located along a current flow path leading from the battery 14 to the voltage regulator 22 and the one or more additional electronic devices 17, as shown in the example of FIG. 1. In some examples, the first current detector 16A may include a first sense resistor 18A, which may, for example, have a resistance within a range between 5 and 10 mΩ. The first sense resistor 18A may be located between the battery 14 and the processor 12.

Figure 2:
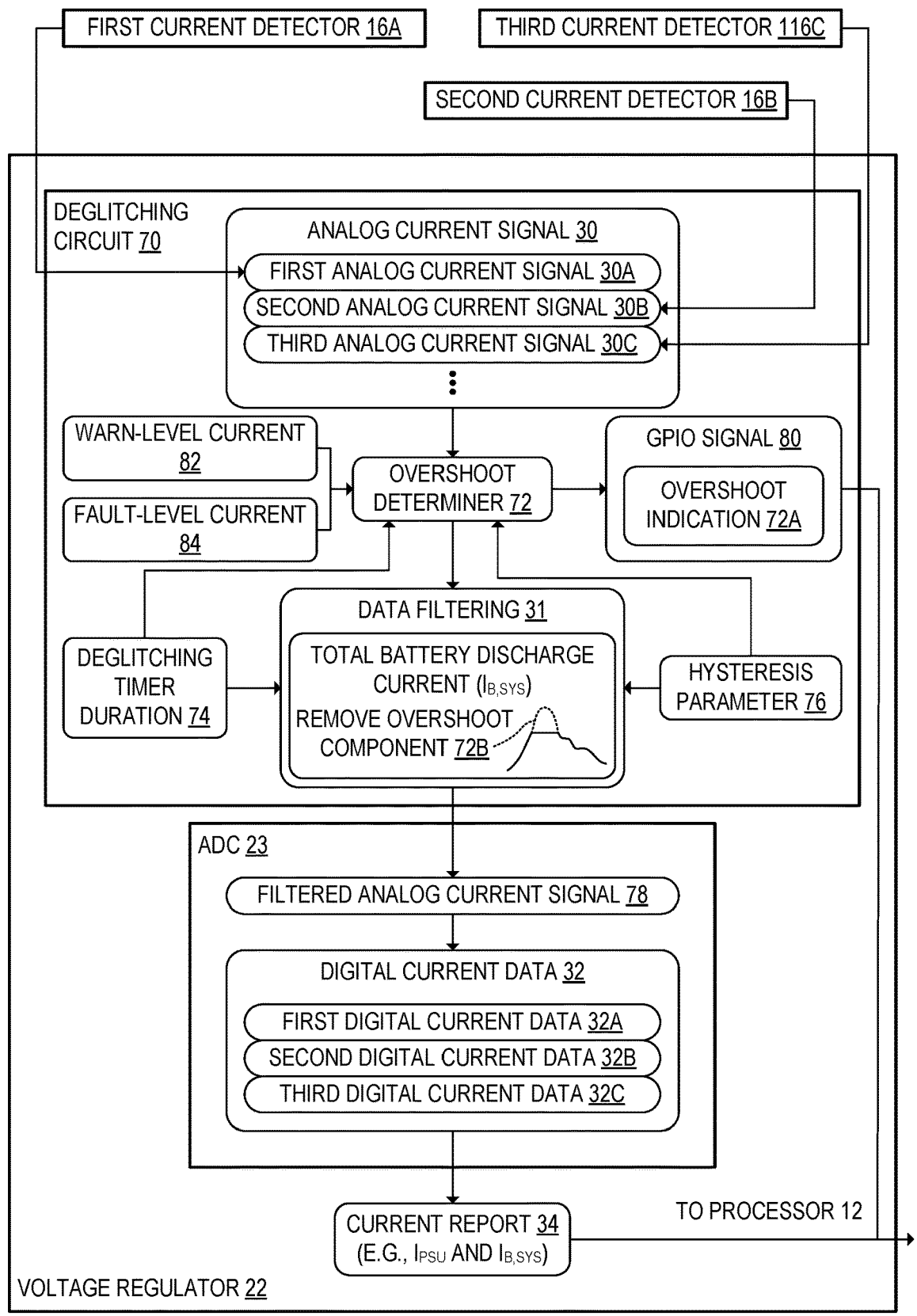
FIG. 2 schematically shows the voltage regulator of the example computing device when an analog current signal is received, according to the example of FIG. 1.

FIG. 2 shows the voltage regulator 22 in additional detail in a state when the voltage regulator 22 receives an analog current signal 30. As shown in the example of FIG. 2, the voltage regulator 22 may be configured to receive a first analog current signal 30A from the first current detector 16A that indicates the total battery discharge current $I_{B,SYS}$. The voltage regulator 22 may be configured to receive the first analog current signal 30A. At the ADC 23, the voltage regulator 22 may be configured to convert the first analog current signal 30A into first digital current data 32A. When the ADC 23 converts the first analog current signal 30A into first digital current data 32A, the ADC 23 may also be configured to perform data filtering 31 on the first analog current signal 30A. The voltage regulator 22 may be further configured to transmit the first digital current data 32A to the processor 12 in a current report 34. Other data, such as digital current data 32 from one or more other current sensors, may also be included in the current report 34.

Returning to FIG. 1, the processor 12 may be configured to receive the first digital current data 32A from the voltage regulator 22 in the current report 34. The processor 12 may be further configured to determine a difference between the total battery discharge current $I_{B,SYS}$ flowing from the battery 14 to the processor 12 via the voltage regulator 22 and to the one or more additional electronic components 17, as indicated by the first digital current data 32A, and an available electric current limit 36 of the battery 14. The available electric current limit 36 may be a threshold level at which the processor 12 is configured to perform processor throttling.

In response to at least determining the difference between the total battery discharge current $I_{B,SYS}$ and the available electric current limit 36, the processor 12 may be further configured to adjust one or more performance parameters 40 of the processor 12 such that the difference is reduced. The processor 12 may be configured to adjust the one or more performance parameters 40 at least in part by executing a performance parameter adjustment module 38 included in firmware of the processor 12. In some examples, the one or more performance parameters 40 may include a voltage $V_P$ supplied to the processor 12. This voltage $V_P$ may be supplied by the battery 14, and may be additionally supplied by the PSU 24 in some examples. Additionally or alternatively, the one or more performance parameters 40 may include a clock rate 42 of the processor 12. Accordingly, when the total battery discharge current $I_{B,SYS}$ is above the available electric current limit 36, the processor 12 may be configured to adjust the one or more performance parameters 40 to reduce the total battery discharge current $I_{B,SYS}$. When total battery discharge current $I_{B,SYS}$ is below the available electric current limit 36, the processor 12 may be configured to adjust the one or more performance parameters 40 to increase the total battery discharge current $I_{B,SYS}$. Thus, the processor 12 may be configured to modify the amount of electric current it receives from the battery 14 to prevent the battery 14 from operating at high levels of current for durations that are likely to degrade battery performance. However, the processor 12 may also increase the amount of electric current drawn from the battery 14 when the total battery discharge current $I_{B,SYS}$ is below the available electric current limit 36 to allow for faster processing.

In some examples, the processor 12 may be configured to adjust the one or more performance parameters 40 at least in part by performing proportional-integral-derivative (PID) control of the one or more performance parameters 40. A technical advantage of using PID control is that control may be effected only based on measurements of the current itself, without having to account for additional variables or model the control system in a fully deterministic manner. In such examples, the instructions for the processor 12 to execute the performance parameter adjustment module 38 may include a proportional-term coefficient, an integral-term coefficient, and/or a derivative-term coefficient of a PID control module. The available electric current limit 36 may be the setpoint of the PID control module.

The voltage regulator 22 may, in some examples, be further configured to transmit a general-purpose input/output (GPIO) signal 80 to the processor 12 when the first analog current signal 30A indicates that a warn-level current 82 or a fault-level current of the processor 12 is exceeded. The warn-level current 82 may be a first current threshold at which the voltage regulator 22 is configured to transmit a GPIO warn signal to the processor 12. The warn-level current 82 may be lower than a fault-level current 84 of the processor 12 at which the voltage regulator 22 is configured to transmit a GPIO fault signal to the processor 12. When the warn-level current 82 or the fault-level current 84 is exceeded, the electric current received at the processor 12 may be near or at a level high enough to damage the processor 12. Thus, the GPIO signal 80 may control the processor 12 to perform emergency throttling, and, in some examples, to initiate shutdown.

It will be appreciated that the embodiment of FIG. 1 may include a single current detector, i.e., the first current detector 16A. A potential technical advantage of such a configuration is that it is possible to detect the current flowing from the battery 14 to the processor 12 using only a single sensor, which has cost and compactness advantages. This enables the current limit control described herein to be effected when the computing device 10 is operated under the power of the battery 14 without the PSU 24 being connected to the external power source 27.

In some examples, the computing device 10 may include one or more additional current detectors. In such examples, the analog current signal 30 may include data received from those additional current detectors in addition to the first current detector 16A. As shown in the example of FIG. 1, the computing device 10 may include a second current detector 16B configured to detect an electric current $I_{PSU}$ flowing to the computing device 10 via the PSU 24. The analog current signal 30 may, in such examples, further include a second analog current signal 30B that indicates the electric current $I_{PSU}$ measured at the second current detector 16B, as shown in FIG. 2. The second current detector 16B may, in some examples, include a second sense resistor 18B. In such examples, the second sense resistor 18B may have a resistance between 5 mΩ and 10 mΩ and may be located between the PSU 24 and the charger 15. It will be appreciated that these values are merely exemplary and that resistance values outside this range may be used in other examples. As described in more detail below, a technical advantage of including the second current detector 16B is that the limit control described herein may be implemented not only when operating with the PSU 24 disconnected from the external power source 27, but also when the PSU 24 of the computing device 10 is connected to the external power source 27, since current flowing from the PSU 24 to the processor 12 without traveling through the battery 14 can be measured.

In examples in which the computing device 10 includes a second current detector 16B, when the computing device 10 is connected to the PSU 24, the voltage regulator 22 may be configured to receive a second analog current signal 30B from the second current detector 16B, as shown in FIG. 2. The voltage regulator 22 may be further configured to convert the second analog current signal 30B into second digital current data 32B at the ADC 23. The voltage regulator 22 may be further configured to transmit the second digital current data 32B to the processor 12. Thus, the second digital current data 32B may be included in the current report 34.

In response to at least receiving the second digital current data 32B from the voltage regulator 22, the processor 12 may be further configured to adjust the one or more performance parameters 40 of the processor 12 based at least in part on the second digital current data 32B. For example, the processor 12 may be configured to increase the one or more performance parameters 40 when the processor 12 determines, as indicated by the second digital current data 32B, that the PSU 24 has become connected to the external power source 27. Thus, the processor 12 may operate with a higher voltage $V_P$ and/or a higher clock rate 42 without exceeding the available electric current limit 36 of the battery 14. Conversely, when the processor 12 determines, as indicated by the second digital current data 32B, that the PSU 24 has become disconnected from the external power source 27, the processor 12 may be configured to reduce the one or more performance parameters 40.

Figure 3:
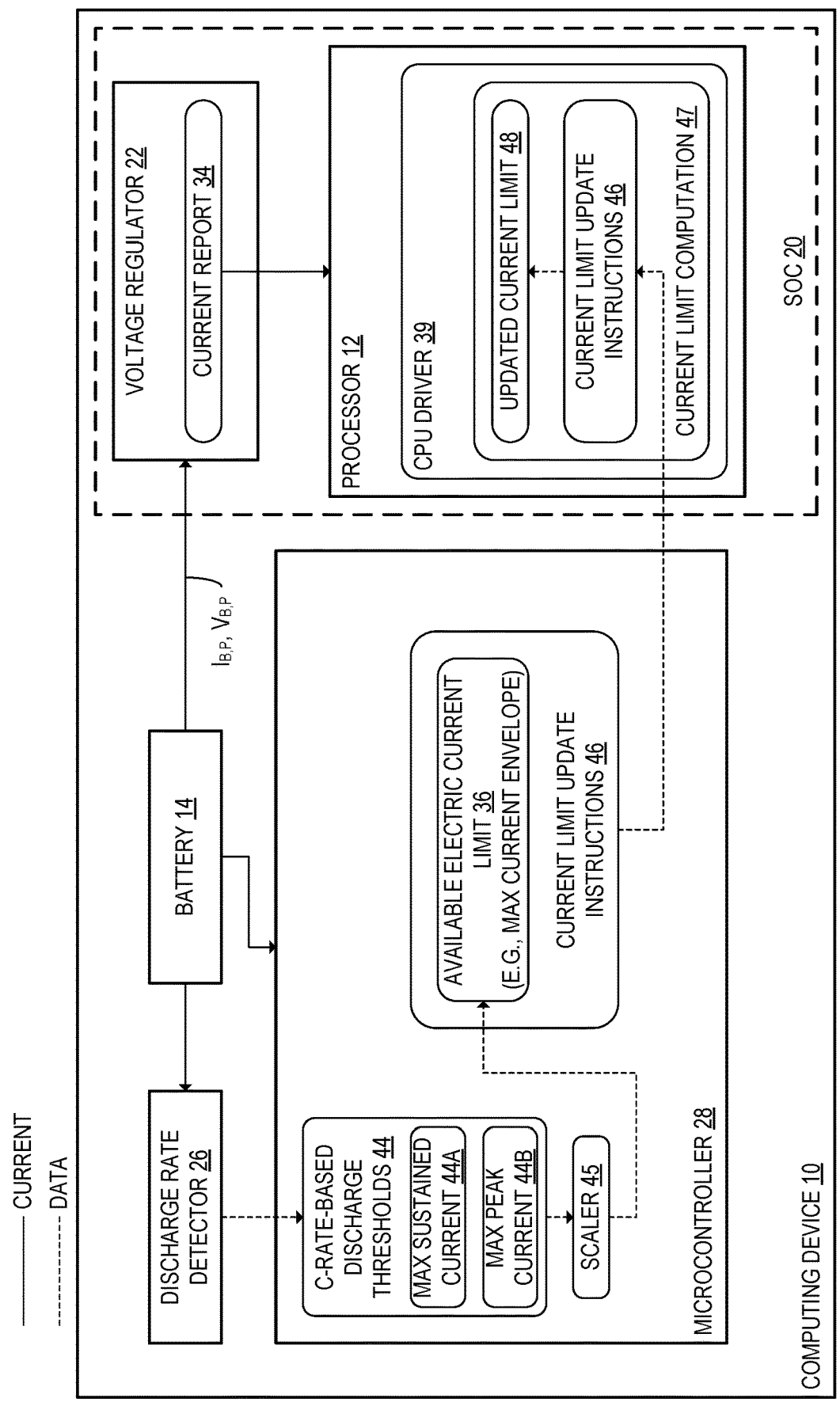
FIG. 3 schematically shows the computing device of FIG. 1 when the microcontroller is configured to transmit current limit update instructions to the processor.

The processor 12 may be configured to modify the available electric current limit 36 based at least in part on current limit update instructions 46 received from the microcontroller 28, as depicted in the example of FIG. 3. The processor 12 and microcontroller 28 are shown in additional detail in FIG. 3 when the processor 12 performs a current limit computation 47 at a CPU driver 39 to update the available electric current limit 36. The discharge rate detector 26 may be configured to measure the discharge C-rate of the battery 14 and, based at least in part on the discharge C-rate, output a plurality of C-rate-based discharge thresholds 44 to the microcontroller 28. In some examples, the plurality of C-rate-based discharge thresholds 44 may include a maximum sustained current 44A and a maximum peak current 44B of the battery 14.

As shown in the example of FIG. 3, the microcontroller 28 may be configured to receive the plurality of C-rate-based discharge thresholds 44 from the discharge rate detector 26. Based at least in part on the plurality of C-rate-based discharge thresholds 44, the microcontroller 28 may be further configured to transmit current limit update instructions 46 to the processor 12. In some examples, the microcontroller 28 may include a scaler 45 that is configured to generate the current limit update instructions 46 at least in part by applying a scaling factor to the value of the available electric current limit 36 as specified by the plurality of C-rate-based discharge thresholds 44. The processor 12 may be further configured to modify the available electric current limit 36 in response to at least receiving the current limit update instructions 46 to thereby generate an updated current limit 48. One technical advantage of updating the current limit is to allow the battery 14 to operate according to a schedule in which the battery 14 discharges at different C-rates for different allowed durations in order to account for changes in energy consumption over time, as discussed in further detail below.

In some examples, when the one or more additional electronic components 17 of the computing device 10 draw large amounts of electric current from the battery 14, the microcontroller 28 may be configured to output current limit update instructions 46 that instruct the processor 12 to lower the available electric current limit 36. Alternatively, when the amount of current drawn from the battery 14 by the one or more additional electronic components 17 is low, the microcontroller 28 may be configured to output current limit update instructions 46 that instruct the processor 12 to raise the available electric current limit 36 and allow the total electric current $I_{B,SYS}$ to increase. Thus, the available electric current limit 36 may be dynamically adjusted based at least in part on the amount of current the battery 14 transmits to the one or more additional electronic components 17 of the computing device 10.

Figure 4:
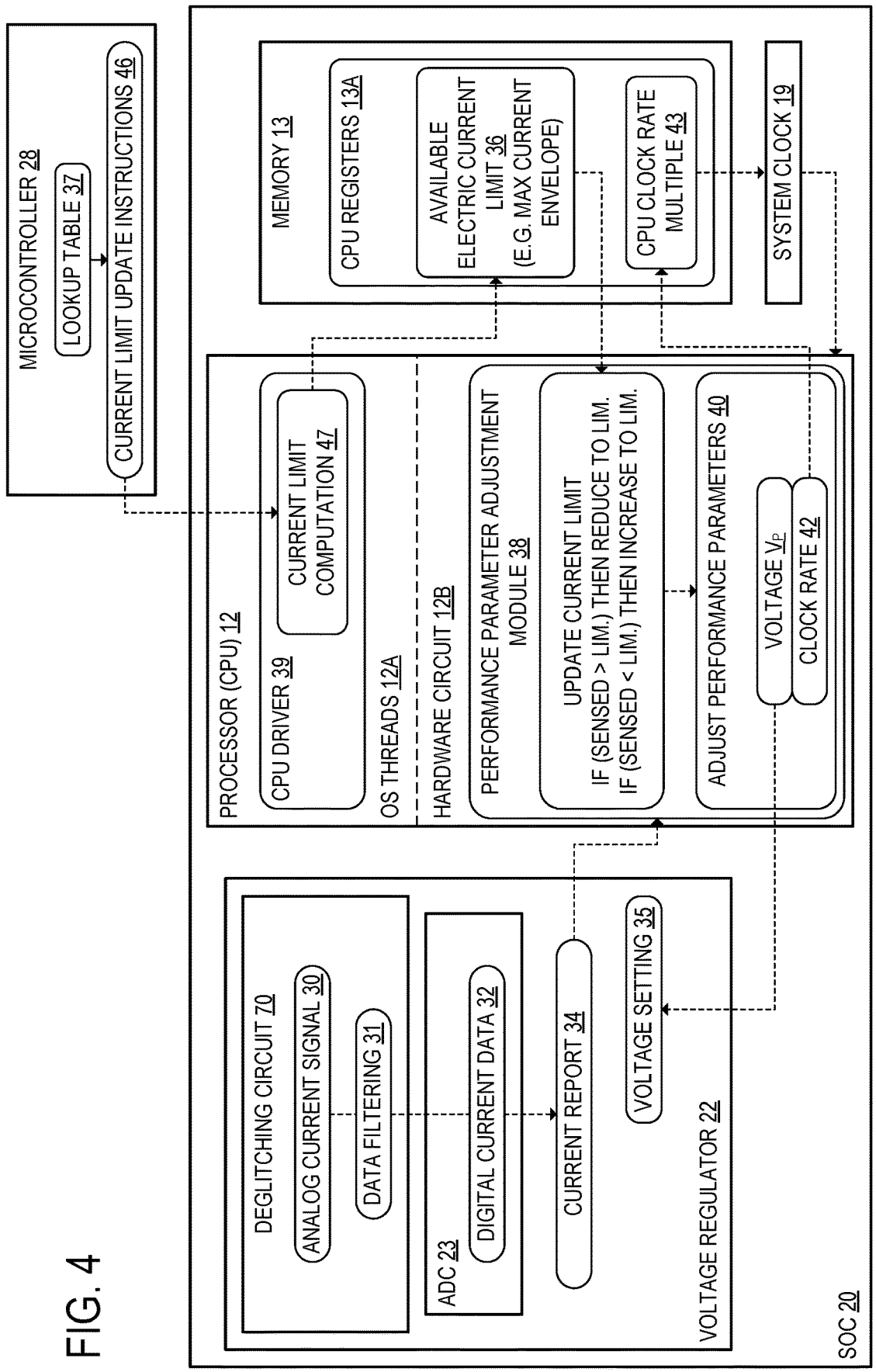
FIG. 4 schematically shows a system-on-a-chip (SoC) included in the computing device, including the processor, the memory, the voltage regulator, and a system clock, according to the example of FIG. 1.

The SoC 20 is shown in additional detail in the example of FIG. 4. As shown in FIG. 4, the processor 12 may be configured to execute a plurality of operating system (OS) threads 12A. The processor 12 may be configured to execute the CPU driver 39 to perform the current limit computation 47, as discussed above with reference to FIG. 3, at the plurality of OS threads 12A. In addition, the memory 13 may include a plurality of CPU registers 13A associated with the processor 12. Subsequently to computing the available electric current limit 36, the processor 12 may be further configured to store the available electric current limit 36 in the plurality of CPU registers 13A.

When the microcontroller 28 generates the current limit update instructions 46, the microcontroller 28 may, in some examples, be configured to refer to a lookup table 37 of respective durations at which the processor 12 is configured to operate at a plurality of different discharge C-rates. Thus, the microcontroller 28 may be configured to map the C-rate-based discharge thresholds 44 received from the discharge rate detector 26 to corresponding time intervals and generate the current limit update instructions 46 based at least in part on those time intervals. The lookup table 37 may be stored in the plurality of CPU registers 13A. Thus, the microcontroller 28 may be configured to read at least a portion of the lookup table 37 from the plurality of CPU registers 13A and generate the current limit update instructions 46 based at least in part on the retrieved portion of the lookup table 37.

As depicted in FIG. 4, the processor 12 may be configured to execute the performance parameter adjustment module 38 at a hardware circuit 12B. When the processor 12 executes the performance parameter adjustment module 38, the hardware circuit 12B of the processor 12 may be configured to read the available electric current limit 36 from the plurality of CPU registers 13A. The hardware circuit 12B may be further configured to receive the current report 34 that indicates the digital current data 32 from the voltage regulator 22. At the hardware circuit 12B, the processor 12 may be configured to adjust the one or more performance parameters 40 based at least in part on the available electric current limit 36 and the current report 34 as discussed above.

When the processor 12 updates the voltage $V_P$, the processor 12 may be configured to transmit a voltage setting 35 from the hardware circuit 12B to the voltage regulator 22. The voltage regulator 22 may be configured to convey electrical power at the voltage setting 35 to the processor 12. When the processor updates the clock rate 42, the hardware circuit 12B may be configured to output a CPU clock rate multiple 43 to the memory 13. The clock rate multiple 43 may be stored in the CPU registers 13A. A system clock 19 included in the SoC 20 may be configured to read the CPU clock rate multiple 43 from the plurality of CPU registers 13A and transmit a clock signal to the processor 12 that has the indicated CPU clock rate multiple 43. Accordingly, the clock rate 42 of the processor 12 may be adjusted at the hardware circuit 12B.

The hardware circuit 12B may be configured to operate independently from the plurality of OS threads 12A executed at the processor 12. Thus, the processor 12 may adjust the one or more performance parameters 40 even when the operating system malfunctions. In addition, the hardware circuit 12B may be configured to respond to changes in the digital current data 32 more quickly than the plurality of OS threads 12A are configured to perform the current limit computation 47 to update the available electric current limit 36. Therefore, hardware control of the one or more performance parameters 40 may allow the processor 12 to adjust for sudden changes in electric current measurements more quickly.

Figure 5:
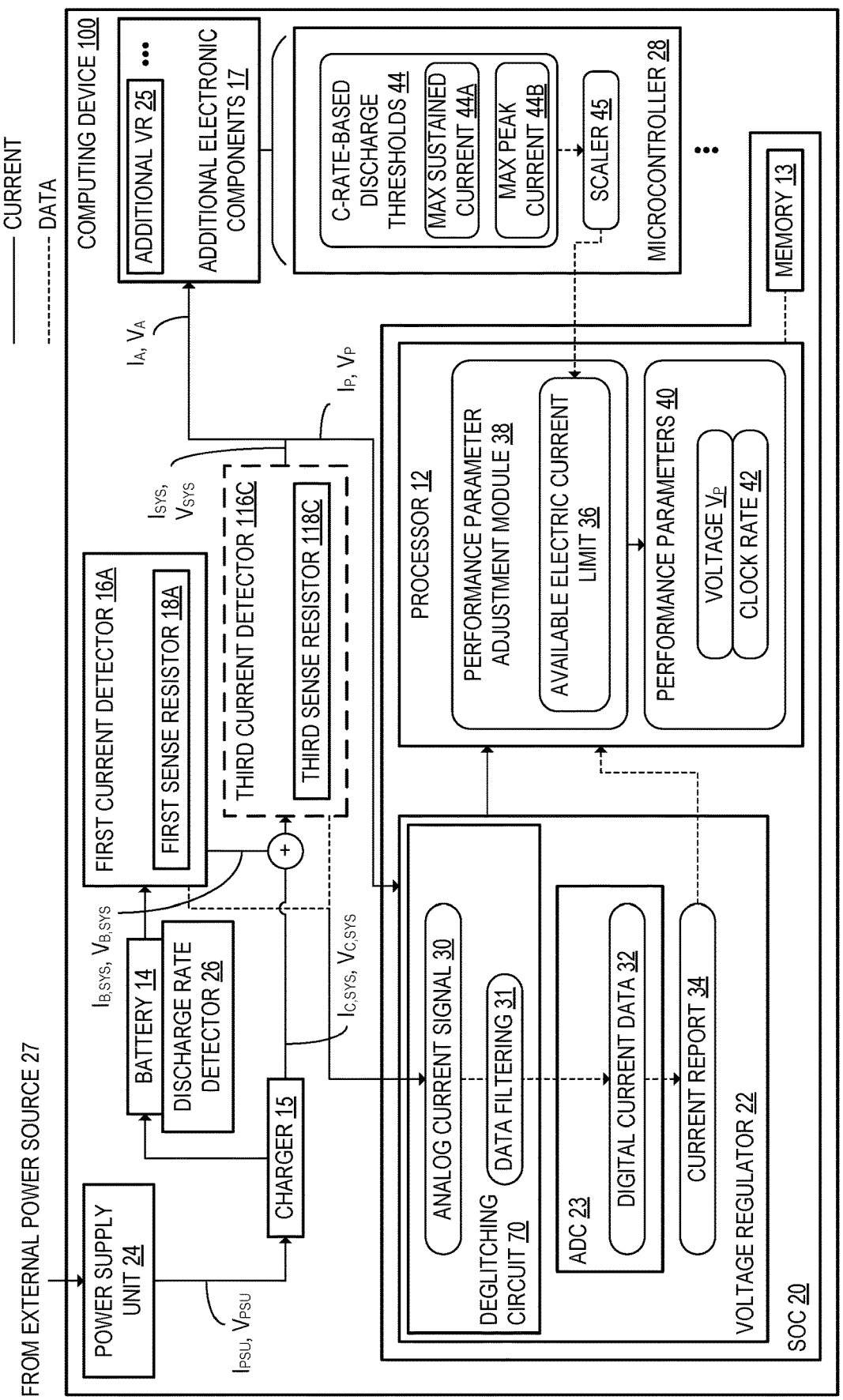
FIG. 5 schematically shows an example computing device including a processor, memory, a battery, a first current detector, a third current detector, a power supply unit, a discharge rate detector, and a microcontroller, according to another example embodiment.

FIG. 5 shows another example computing device 100 including a third current detector 116C. The third current detector 116C may be configured to detect a total system current $I_{SYS}$ flowing from the battery 14 and the PSU 24 to the processor 12 and to one or more additional electronic components 17 of the computing device 10. The total system current $I_{SYS}$ may be equal to the sum of the total battery discharge current $I_{B,SYS}$ and a charger system current $I_{C,SYS}$ flowing from the charger 15 to the processor 12 and the one or more additional electronic components 17. The third current detector 116C may, for example, include a third sense resistor 118C. The third sense resistor 118C may, in such examples, have a resistance between 5 mΩ and 10 mΩ and may be located along a current flow path that leads from the battery 14 to the one or more additional electronic components 17. As in the example above, these resistance values should be understood as merely exemplary as other values may be adopted in other configurations.

In the example of FIG. 5, the voltage regulator 22 may be further configured to receive a third analog current signal 30C indicating the total system current $I_{SYS}$ from the third current detector 116C, as depicted in FIG. 2, and convert the third analog current signal 30C into third digital current data 32C at the ADC 23. The voltage regulator 22 may be further configured to transmit the third digital current data 32C to the processor 12. A technical advantage of including the third current detector 116C in this configuration is that an accurate measurement of current flowing to the processor 12 and the one or more additional electronic components 17 from both the battery 14 and the charger 15 may be obtained, thereby allowing for more accurate measurement of the total current drawn by the system.

Subsequently to receiving the third digital current data 32C, the processor 12 may be further configured to adjust the one or more performance parameters 40 of the processor 12 based at least in part on the third digital current data 32C. In examples in which the digital current data 32 further includes first digital current data 32A received from a first current detector 16A configured to measure the total battery discharge current $I_{B,SYS}$ flowing from the battery 14 to the processor 12 and the one or more additional electronic components 17, as depicted in the example of FIG. 5, the processor 12 may be configured to compute the charger system current $I_{C,SYS}$ by subtracting the total battery discharge current $I_{B,SYS}$ from the total system current $I_{SYS}$. The processor 12 may, in such examples, be further configured to adjust the performance parameters 40 based at least in part on the charger system current $I_{C,SYS}$. For example, when the PSU 24 supplies large amounts of current to the processor 12 and the one or more additional electronic components 17 via the charger 15 (e.g. when the PSU 24 is connected to the external power source 27 and the battery 14 is at or near full capacity), the processor 12 may be configured to increase the voltage $V_P$ and/or the clock rate 42.

Figure 6:
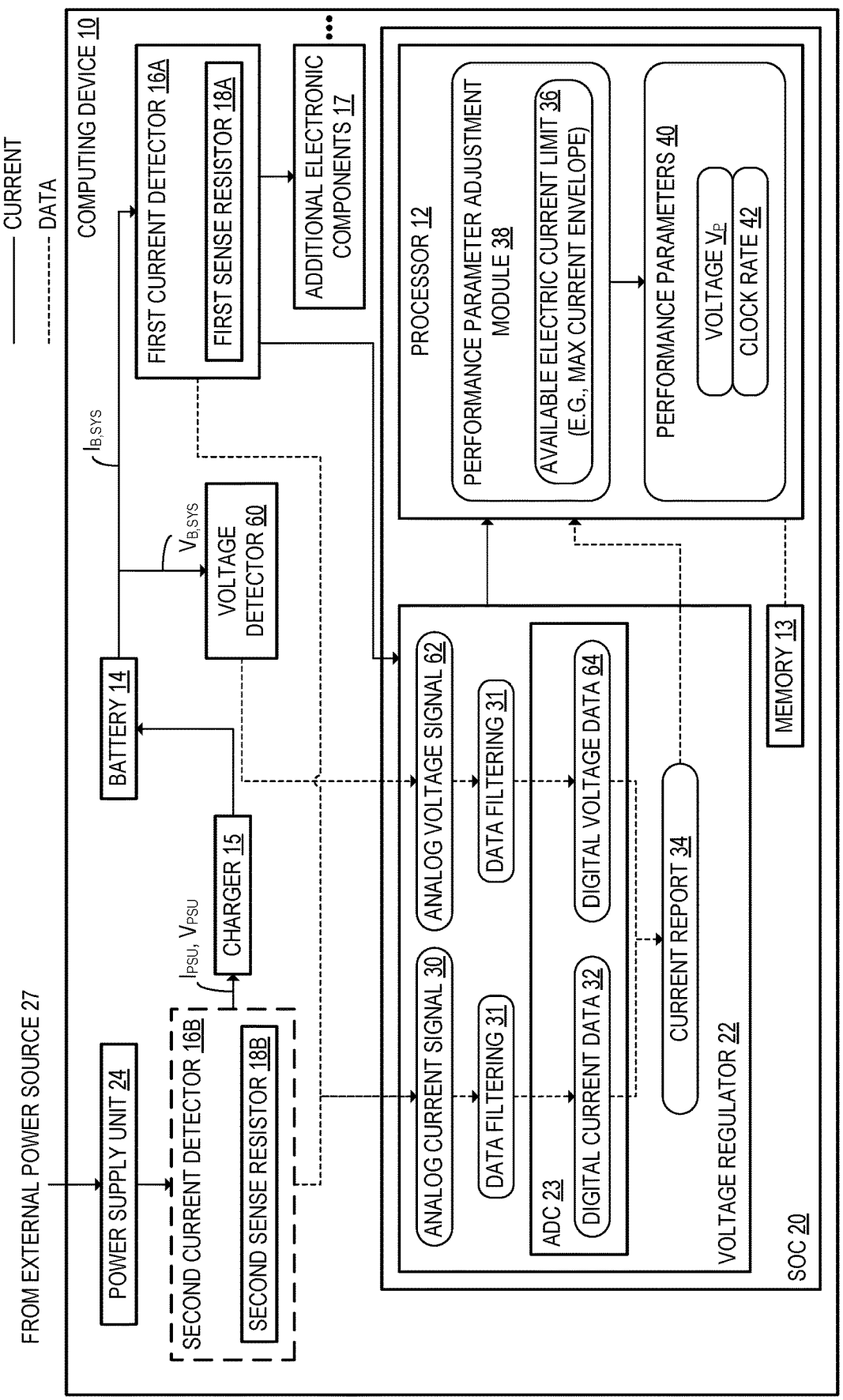
FIG. 6 schematically shows the example computing device of FIG. 1 when the computing device further includes a voltage detector.

FIG. 6 shows the computing device 10 in an example in which the computing device 10 further includes a voltage detector 60 configured to detect a voltage $V_{B,SYS}$ supplied to the processor 12 by the battery 14 via the voltage regulator 22 and to the one or more additional electronic components 17. In the example of FIG. 6, the voltage regulator 22 may be further configured to receive analog voltage data 62 indicating the voltage $V_{B,SYS}$ from the voltage detector 60. The voltage regulator 22 may be further configured to convert the analog voltage data 62 into digital voltage data 64 at the ADC 23 and transmit the digital voltage data 64 to the processor 12.

In examples in which the processor 12 receives digital voltage data 64 from the voltage regulator 22, the processor 12 may be further configured to adjust the one or more performance parameters 40 based at least in part on the digital voltage data 64. In some examples, when the one or more performance parameters 40 of the processor 12 include the voltage $V_P$ supplied to the processor 12, the voltage regulator 22 may be configured to receive the analog voltage data 62 indicating the voltage $V_{B,P}$ supplied to the processor 12 by the battery 14 with a higher sampling frequency than the frequency at which the processor 12 is configured to adjust the voltage $V_P$. In such examples, the processor 12 may control the one or more performance parameters 40 more quickly than if the voltage $V_P$ were controlled at the processor 12 without receiving the digital voltage data 64 from the voltage regulator 22.

Returning to FIG. 2, the voltage regulator 22 may further include a deglitching circuit 70 in some examples. The deglitching circuit 70 may be configured to remove, from the first analog current signal 30, overshoot components 72B for which the total battery discharge current $I_{B,SYS}$ received at the processor 12 and additional electronic components 17 from the battery 14 is greater than or equal to the available electric current limit 36 for less than a deglitching timer duration 74. It will be appreciated that the deglitching circuit 70 may include an overshoot determiner 72 that is configured to output an overshoot indication 72A via a GPIO signal 80 to the processor 12 when the total battery discharge current $I_{B,SYS}$ exceeds either a warn-level current value 82 or fault-level current value 84 for a period of time that is equal to the deglitching timer duration 74. The overshoot determiner 72 may be part of the deglitching circuit 70, as shown, or a separate circuit. The processor 12 is configured to reduce its power consumption by reducing its clock rate in response to a warn-level overshoot indication 72A or shut down in response to a fault-level overshoot indication 72A.

To avoid reporting intermittent current spikes that are shorter than would trigger an overshoot indication 72A, when the electric current $I_{B,SYS}$ exceeds the available electric current limit 36, the voltage regulator 22 may be configured wait for the deglitching timer duration 74 to elapse before generating the current report 34. By waiting, the deglitching circuit 70 enables the overshoot determiner 72 to properly determine whether any overshoot occurred that was for greater than the deglitching timer duration 74, and also enables the data filtering 31 to remove any overshoot components 72B of the analog current signal 30. By removing the one or more overshoot components 72B that are shorter than the deglitching timer duration 74 from the electric current data 30, the deglitching circuit 70 may generate one or more filtered electric current signals 78, which do not contain intermittent current spikes that are too short to trigger an overshoot indication 72A. The current report 34 that is transmitted to the processor 12 may be generated from the filtered electric current data 78. This has the technical benefit of stabilizing the current measurements of the system, which results in more stable control.

FIGS. 7A-7B show a first example plot 90A and a second example plot 90B of the total battery discharge current $I_{B,SYS}$ as a function of time t in examples in which the voltage regulator 22 includes a deglitching circuit 70. In the first example plot 90A of FIG. 7A, the deglitching circuit 70 has a first deglitching timer duration 74A that is longer than a current spike duration 92 of the processor 12. The current spike duration 92 may be a duration for which the processor 12 is configured to operate at a warn-level current 82. In some examples, the value of the current spike duration 92 may be hardcoded at the processor 12 in the hardware circuit 12B.

The electric current $I_{B,SYS}$ received at the system from the battery 14 in the first example plot 90A of FIG. 7A starts at a first current value $I_0$ at a time $t_0$. The first current value $I_0$ may, for example, be a long-term current limit of the processor 12. At time $t_1$, the electric current $I_{B,SYS}$ increases to a second current value $I_1$, which is a current value at which the warn-level current 82 of the processor 12 is exceeded in the example of FIG. 7A. The system remains at the second current value $I_1$ for the current spike duration 92 and decreases the electric current $I_{B,SYS}$ drawn from the battery 14 to a third current value $I_2$ at a time $t_2$. The third current value $I_2$ may, for example, be a current level at which the processor 12 operates at a short-term current limit. Since the current spike duration 92 is shorter than the first deglitching timer duration 74A, the digital current data 32 transmitted from the voltage regulator 22 to the processor 12 does not include the current spike.

In the second example plot 90B of FIG. 7B, the deglitching circuit 70 has a second deglitching timer duration 74B that is shorter than the current spike duration 92 for which the processor 12 is configured to operate at the warn-level current 82. As in the example of FIG. 7A, the processor 12 and the one or more additional electronic devices 17 in the example of FIG. 7B initially draw a total battery discharge current $I_{B,SYS}$ with the first current value $I_0$, and subsequently increases the total battery discharge current $I_{B,SYS}$ to the second current value $I_1$ at time $t_1$. However, in the example of FIG. 7B, the voltage regulator 22 is configured to detect that the processor 12 has operated at the warn-level current 82 (which is reached when the total system current $I_{B,SYS}$ is equal to the second current value $I_1$ in the example of FIG. 7B) for the second deglitching timer duration 74B. The detection of the current spike is therefore transmitted to the processor 12 in the GPIO signal 80. In response to at least detecting that the processor 12 has operated at the available electric current limit 36 for the second deglitching timer duration 74B, the processor 12 performs throttling of the one or more performance parameters 40 that reduces the total battery discharge current $I_{B,SYS}$ to a fourth current value $I_3$ that is between the first current value $I_0$ and the third current value $I_2$. When the current spike duration 92 has elapsed, the total battery discharge current $I_{B,SYS}$ increases to the third current value $I_2$.

Returning to FIG. 2, in some examples, the deglitching circuit 70 may additionally have a hysteresis parameter 76 that is utilized when filtering the analog current signal 30 during data filtering 31 and also during overshoot determination by the overshoot determiner 72. The hysteresis parameter 76 may, for example, be an overshoot indication reset threshold. In such examples, subsequently to a prior overshoot indication 72A, the overshoot determiner 72 of the deglitching circuit 70 may not detect an overshoot of the available electric current limit 36 until the total battery discharge current $I_{B,SYS}$ has changed by an amount exceeding the hysteresis parameter 76. Thus, using a hysteresis parameter 76 at the deglitching circuit 70 may prevent the deglitching circuit 70 from determining overshoot exists where in fact overshoot conditions are not met, for example, when the voltage regulator 22 receives a noisy analog current signal 30. In examples in which the voltage regulator 22 receives an analog current signal 30 from a plurality of current detectors, the plurality of current detectors may have a respective plurality of hysteresis parameters 76. It will be appreciated that if no overshoot is detected at the overshoot determiner 72 due to the use of hysteresis parameters, then correspondingly no overshoot component 72B is removed from the analog current signal 30 by logic associated with data filtering 31.

Figure 7C:
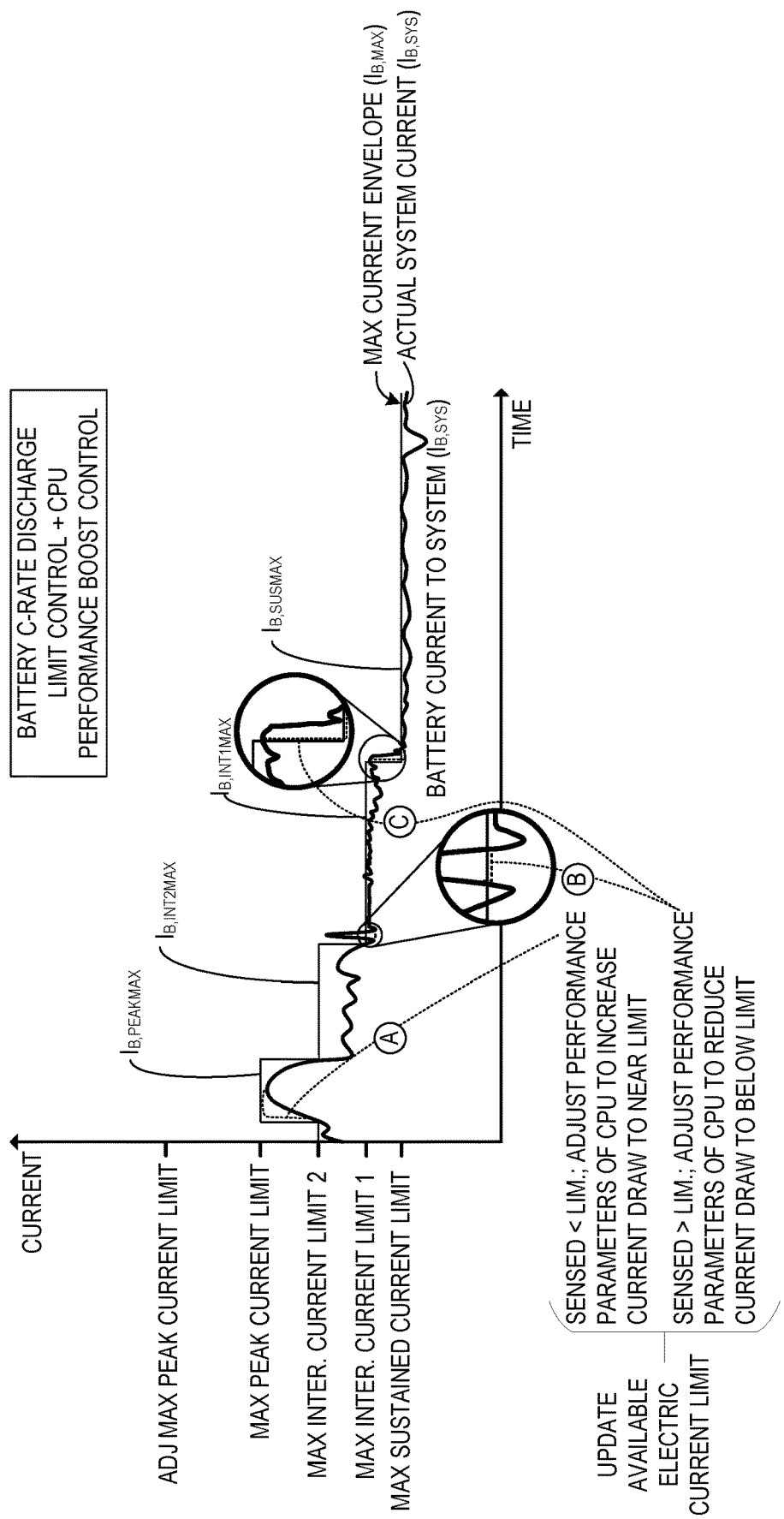
FIG. 7C shows a third prophetic example plot of the actual system current being controlled relative to a maximum current envelope in a battery only mode, by the computing device of FIG. 1.

FIG. 7C illustrates a third prophetic example plot of actual system current $I_{B,SYS}$ being controlled relative to an available electric current limit 36, which in this example is a maximum current envelope, in a battery-only mode by the computing device 10 of FIG. 1. The available electric current limit 36 of the computing device 10 of FIG. 1 may include a plurality of available electric current limits for a plurality of durations, as shown in Table 1 below. Typically, maximum sustained current 44A $I_{B,SUSMAX}$ for a first duration and a maximum peak current 44B $I_{B,PEAKMAX}$ of the battery 14 may be specified. These values account for battery chemistry and other design factors. As discussed above, scaler 45 is configured to compute one or more scaled values intermediate the peak and sustainable limits, such as the maximum first intermediate current $I_{B,INT1MAX}$ and maximum second intermediate current $I_{B,INT2MAX}$ listed below in Table 1. The currents listed in Table 1 form an example maximum current envelope $I_{B,INT1MAX}$.

TABLE 1

Maximum Current Envelope

| Limit | Symbol | C-Rate | Duration |
|---|---|---|---|
| MAX PEAK CURRENT | $I_{B,PEAKMAX}$ | 1.8C | Any |
| MAX SECOND INTERMEDIATE CURRENT | $I_{B,INT2MAX}$ | 1.4C | 100 Secs |
| MAX FIRST INTERMEDIATE CURRENT | $I_{B,INT1MAX}$ | 1.3C | 500 Secs |
| MAX SUSTAINED CURRENT | $I_{B,SUSMAX}$ | 1.0C | No limit |

When placed in operation, multiple countdown timers implemented in parallel by the processor 12 to track the time the actual system current $I_{B,SYS}$ stays above each respective limit in the maximum current envelope. When a countdown timer for a particular limit expires, indicating that the duration of time associated with that limit has passed, then the limit is enforced, and the processor 12 adjusts its voltage $V_P$ or clock rate 42 to reduce power draw to below the limit.

A technical difficulty with implementing current limits in this manner using a software-based approach by which the current limit computation 47 is performed in a CPU driver 39 as shown in FIG. 4, is that the response time for the driver to compute updated limits and communicate them to the processor 12 via CPU registers 13A can be relatively slow, thereby leading to limit overshoot or significant undershoot. Three examples of this are illustrated in FIG. 7C, at (A), (B), and (C). At (A), the dark line shows the actual system current $I_{B,SYS}$ exceeding the maximum second intermediate current $I_{B,INT2MAX}$ (after, for example, the expiration of a timer limiting current to under the maximum second intermediate current $I_{B,INT2MAX}$) under control of the CPU driver 39, without use of the hardware control loop based on current report 34. Since the CPU driver 39 takes time $t_0$ to update the maximum current envelope stored in the CPU registers 13A, the processor 12 does not immediately take advantage of the additional performance available. On the other hand, the dashed line at (A) shows a prophetic illustration of the performance advantage offered by adjusting the performance parameters 40 of the processor 12 via the performance parameter adjustment module 38 based on the current report 34 of actual system current. Accordingly, the processor 12 may increase current draw to near the maximum second intermediate current $I_{B,INT2MAX}$ limit and thereby increase performance. Via the hardware control loop, the processor 12 may avoid significant undershoot by responding more quickly than would have occurred under control of the software control loop through CPU driver 39 alone, in battery-only mode.

At (B) in FIG. 7C, a sensed value for a spike in actual system current $I_{B,SYS}$ that exceeds the maximum first intermediate current $I_{B,INT1MAX}$ is shown as being allowed by the control loop through the CPU driver 39 (without use of the hardware control loop enabled by current report 34), because the software control loop fails to respond quickly enough to detect the current overshoot and enforce CPU limit parameters to prevent the overshoot. On the other hand, as shown by the dashed line at (B), the hardware control loop quickly reports the actual system current $I_{B,SYS}$ to the processor 12 via the current report 34. The current report 34 may enable the performance parameter adjustment module 38 of the processor 12 to enforce the current limit by quickly adjusting performance parameters 40 to reduce the current draw of the processor 12 to below the maximum first intermediate current $I_{B,INT1MAX}$. As a result, battery performance can be prevented from being degraded due to exceeding discharge limits, in battery-only mode.

At (C) in FIG. 7C, the dark line shows actual system current $I_{B,SYS}$ controlled by the software loop through CPU driver 39 controlling the CPU to draw down current after the maximum second intermediate current duration has been exceeded, without use of the hardware control loop enabled by current report 34. As shown, the CPU driver 39 cannot react quickly enough to prevent overshoot at the instant the timer has expired for the maximum second intermediate current duration, which can result in battery degradation over time. Using the hardware-based control loop which reports the actual system current $I_{B,SYS}$ in current report 34 to the processor 12 may enable the processor 12 to react quickly to reduce the sensed current value to below the applicable limit by adjusting the performance parameters 40, thereby avoiding overshoot. As a result, battery performance can be prevented from being degraded due to exceeding discharge limits in battery-only mode.

Figure 7D:
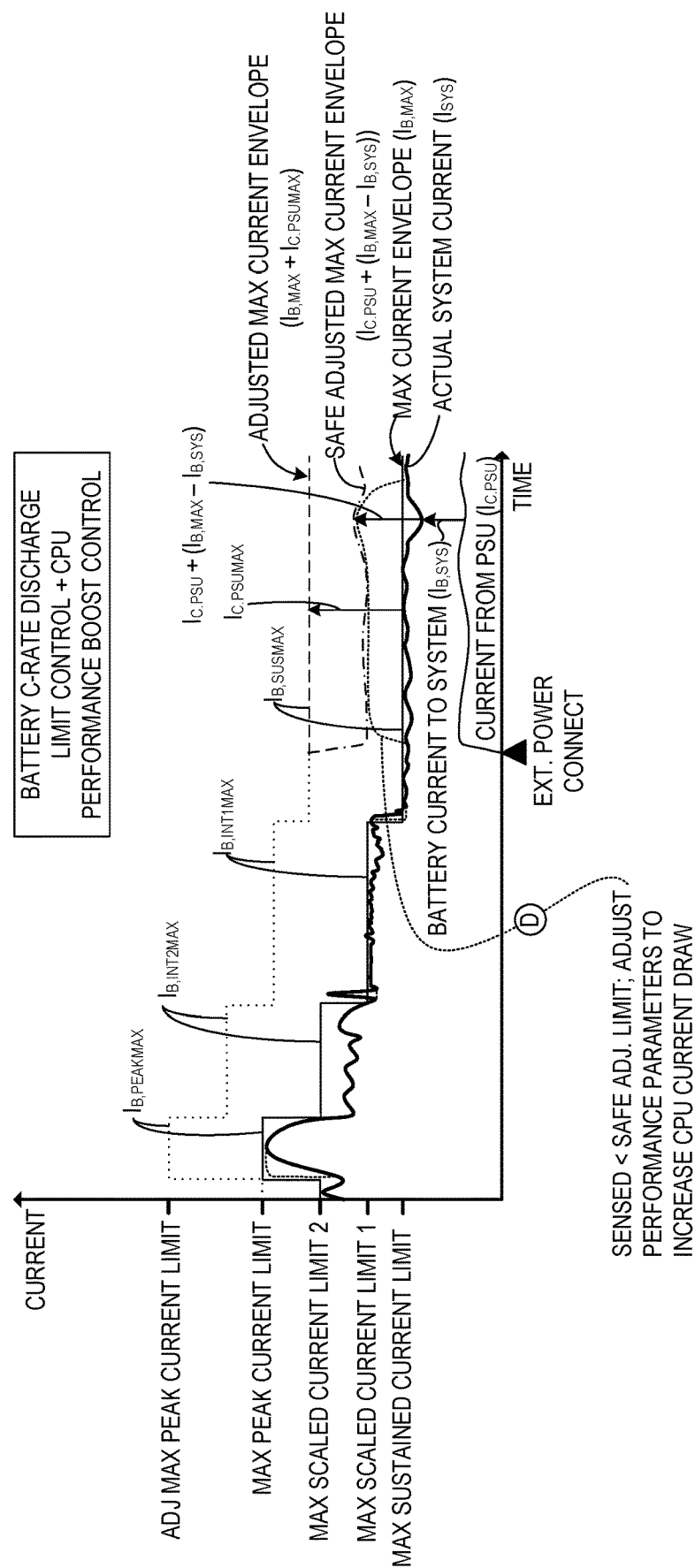
FIG. 7D shows a fourth prophetic example plot of the actual system current being controlled relative to a maximum current envelope in a mode in which power is supplied both from the power supply unit and the battery, by the computing device of FIG. 1.

FIG. 7D illustrates a fourth prophetic example plot of actual system current $I_{B,SYS}$ being controlled relative to an available electric current limit 36, which in this example is a maximum current envelope, in a battery-plus-PSU mode by the computing device of FIG. 1. In this example, the PSU 24 is connected to an external power source 27 at a point in time indicated by a triangle symbol. At the point in time at which the external power is connected, the PSU 24 begins supplying current $I_{PSU}$ to the computing device 10. The charger 15 receives the current $I_{PSU}$ and transforms the current $I_{PSU}$ into a charger output current $I_{C,PSU}$ that has a suitable voltage for charging the battery 14 and supplying power to the SoC 20 and additional electronic components 17. From this point on, the maximum current envelope $I_{B,MAX}$ is theoretically raised by the value of the maximum current that can be supplied by the PSU 24 via the charger 15, $I_{C,PSUMAX}$, as indicated in by a dashed line. The dotted line that extends in stair-step fashion to the left of the dashed line in FIG. 7D shows the lift provided by $I_{C,PSUMAX}$ across all current limits in the maximum current envelope, which it will be appreciated are operating in parallel even at the point of connection to external power in the figure. Once the PSU 24 is connected, the processor 12 can increase its performance above the maximum current envelope $I_{B,MAX}$ for the battery-only mode by adjusting performance parameters 40. However, if the processor 12 increases to the adjusted maximum current envelope, which is computed as $I_{B,MAX}+I_{C,PSUMAX}$, then there is a risk of over-discharging the battery above its current limits that define the maximum current envelope $I_{B,MAX}$. For this reason, the processor 12 is configured to compute a safe adjusted maximum current envelope, $I_{C,PSU}+(I_{B,MAX}-I_{B,SYS})$, illustrated by a dot-dash line. By increasing performance parameters 40 based on the current report 34 to increase performance but still keep actual system current within the safe adjusted maximum current envelope as shown by the dashed line at (D), performance can be maximized while not exceeding the battery discharge limits specified in the maximum current envelope during the battery-plus-PSU mode.

Figure 8:
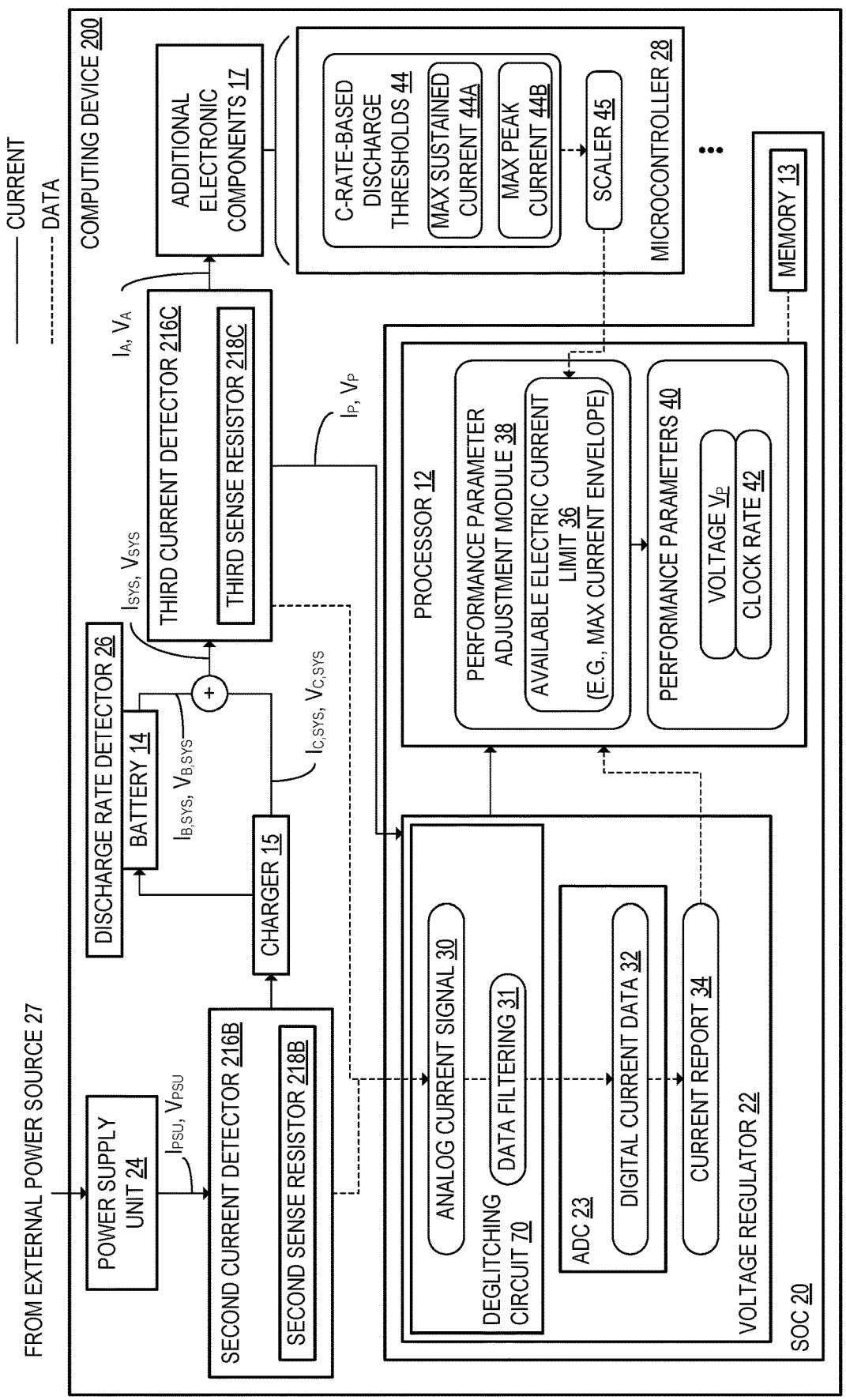
FIG. 8 schematically shows an example computing device including a processor, memory, a battery, a second current detector, a third current detector, a power supply unit, a discharge rate detector, and a microcontroller, according to another example embodiment.

FIG. 8 schematically depicts another example computing device 200 that includes a second current detector 216B corresponding to the second current detector 16B included in the computing device 10 of FIG. 1. In addition, the example computing device 200 includes a third current detector 216C corresponding to the third current detector 116C included in the computing device 100 of FIG. 5. The second current detector 216B may include a second sense resistor 218B located between the PSU 24 and the charger 15. The third current detector 216C may include a third sense resistor 218C located downstream of the battery 14 and the charger 15 and upstream of the voltage regulator 22 and the one or more additional electronic components 17 of the computing device 200. However, the example computing device 200 of FIG. 8 does not include a current detector in a location corresponding to that of the first current detector 16A of FIG. 1.

In the example of FIG. 8, the voltage detector 22 may be configured to receive an analog current signal 30 from the second current detector 216B and the third current detector 216C and convert that analog current signal 30 into digital current data 32 that is transmitted to the processor 12. Based at least in part on the digital current data 32, the processor 12 may be configured to determine the total battery discharge current $I_{B,SYS}$ flowing from the battery 14 to the processor 12 and to the one or more additional electronic components 17. For example, the processor 12 may be configured to estimate the total battery discharge current $I_{B,SYS}$ by subtracting the PSU current $I_{PSU}$ measured by the second current detector 216B from the total system current $I_{SYS}$ measured by the third current detector 216C. The processor 12 may be further configured to adjust the one or more performance parameters 40 based at least in part on the estimated value of $I_{B,SYS}$ as discussed above for the example computing devices of FIG. 1 and FIG. 5.

A technical advantage of including the second current detector 216B and third current detector 216C in this configuration is that the PSU current $I_{PSU}$ may be more accurately measured when the PSU 24 is connected to the external power source 27 while also allowing the total battery discharge current $I_{B,SYS}$ to be accurately measured when the PSU 24 is disconnected. The total system current $I_{SYS}$ may be equal to the total battery discharge current $I_{B,SYS}$ when the PSU 24 is disconnected from the external power source 27.

Figure 9A:
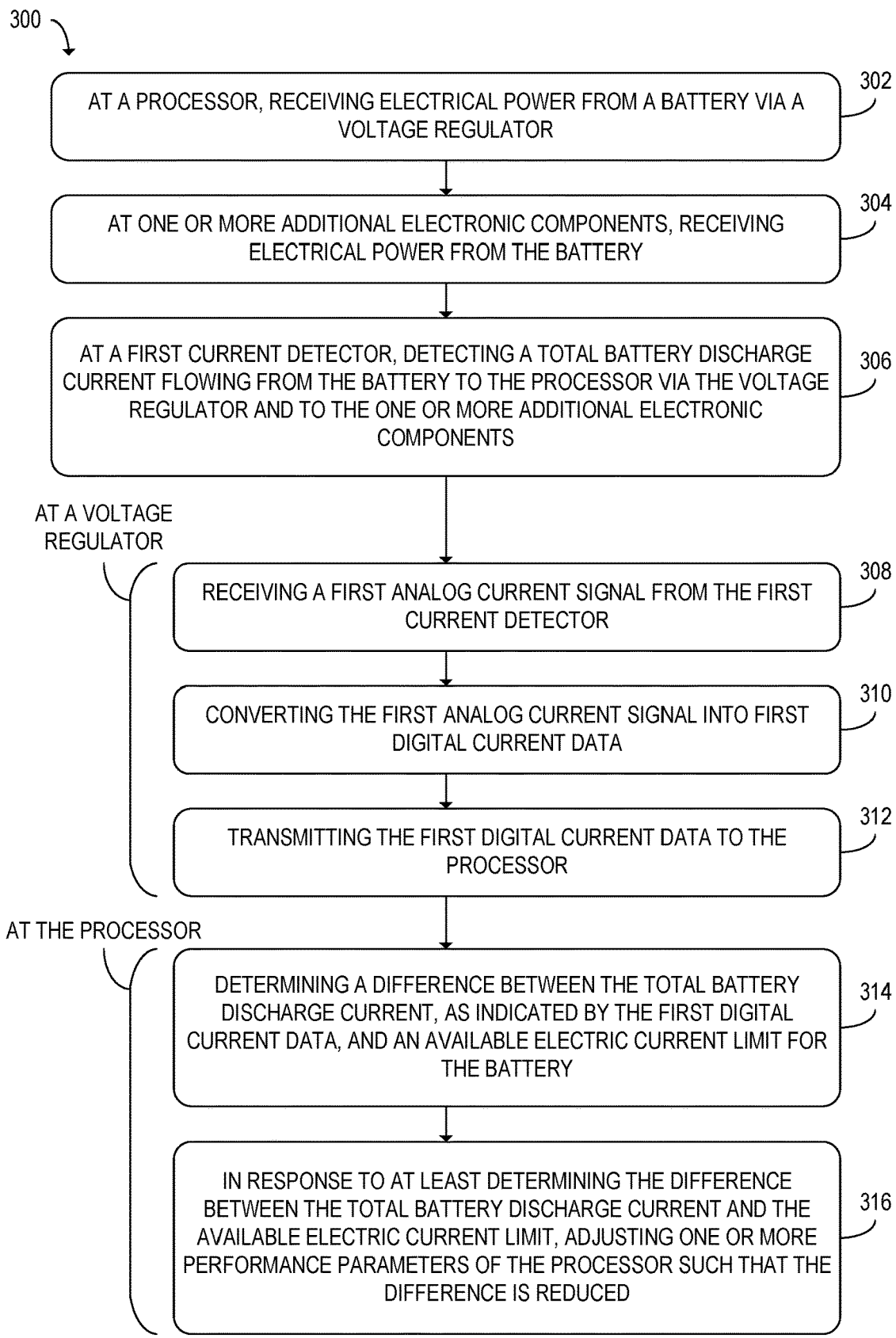
FIG. 9A shows a flowchart of method for use with a computing device to perform processor throttling via a voltage regulator, according to the example of FIG. 1.

FIG. 9A shows a flowchart of method 300 for use with a computing device to perform processor throttling via a voltage regulator. The method 300 may be performed at the computing device 10 of FIG. 1, the computing device 100 of FIG. 5, the computing device 200 of FIG. 8, or some other computing device. At step 302, the method 300 may include, at a processor, receiving electrical power from a battery via a voltage regulator included in the computing device. In some examples, the processor and the voltage regulator may be included in an SoC. At step 304, the method 300 may further include receiving electrical power from the battery at one or more additional electronic components of the computing device. The one or more additional electronic components may, for example, include a battery discharge rate detector, a microcontroller, one or more input devices, one or more output devices, and/or one or more other types of additional electronic components.

At step 306, the method 300 may include, at a first current detector, detecting a total battery discharge current flowing from the battery to the processor via the voltage regulator and to the one or more additional electronic components. The first current detector may, for example, include a first sense resistor located downstream of the battery and upstream of the voltage regulator and the one or more additional electronic components.

Steps 308, 310, and 312 of the method 300 may be performed at the voltage regulator. At step 308, the method 300 may further include receiving a first analog current signal from the first current detector. The first analog current signal may include a plurality of sampled values of the electric current received from the battery at the processor via the voltage regulator and at the one or more additional electronic components. At step 310, the method 300 may further include converting the first analog current signal into first digital current data at an ADC included in the voltage regulator. At step 312, the method 300 may further include transmitting the first digital current data to the processor in a current report. Other data may also be included in the current report in some examples.

In some examples, when step 310 is performed, the voltage regulator may be configured to generate filtered electric current data at a deglitching circuit included in the voltage regulator. Filtering the electric current data may include removing, from the first analog current signal, one or more overshoot components for which the total battery discharge current from the battery is greater than or equal to the available electric current limit for less than a deglitching timer duration. Accordingly, the deglitching circuit may reduce noise in the electric current data by filtering out short intervals in which the electric current output by the battery is greater than or equal to the available electric current limit. In some examples, the deglitching timer duration may be longer than a current spike duration for which the processor is configured to operate at a warn-level current. The warn-level current may be a current level at which the voltage regulator is configured to output a GPIO signal to the processor that functions as a high-current warning signal for the processor to perform emergency throttling. The current spike duration may be hardcoded in a hardware circuit of the processor. In other examples, the deglitching timer duration may be shorter than the current spike duration for which the processor is configured to operate at the warn-level current.

Steps 314 and 316 of the method 300 may be performed at the processor subsequently to receiving the current report including the first digital current data. At step 314, the method 300 may further include determining a difference between the total battery discharge current, as indicated by the first digital current data, and an available electric current limit of the battery. The difference between the electric current output by the battery and the available electric current limit may be computed at a hardware circuit of the processor that is configured to operate separately from an operating system executed at the processor. The available electric current limit may be retrieved by the hardware circuit from a memory register of the processor when the difference is computed.

At step 316, in response to at least determining the difference between the total battery discharge current and the available electric current limit, the method 300 may further include adjusting one or more performance parameters of the processor such that the difference is reduced. The one or more performance parameters may include a voltage supplied to the processor. Additionally or alternatively, the one or more performance parameters may include a clock rate of the processor. In examples in which the one or more performance parameters include the voltage supplied to the processor, the processor may transmit a voltage setting to the voltage regulator. In examples in which the one or more performance parameters include the clock rate of the processor, the processor may store a CPU clock rate multiple in a plurality of CPU registers included in the memory. The CPU clock rate may then be accessed by a system clock included in the computing device.

Figure 9B:
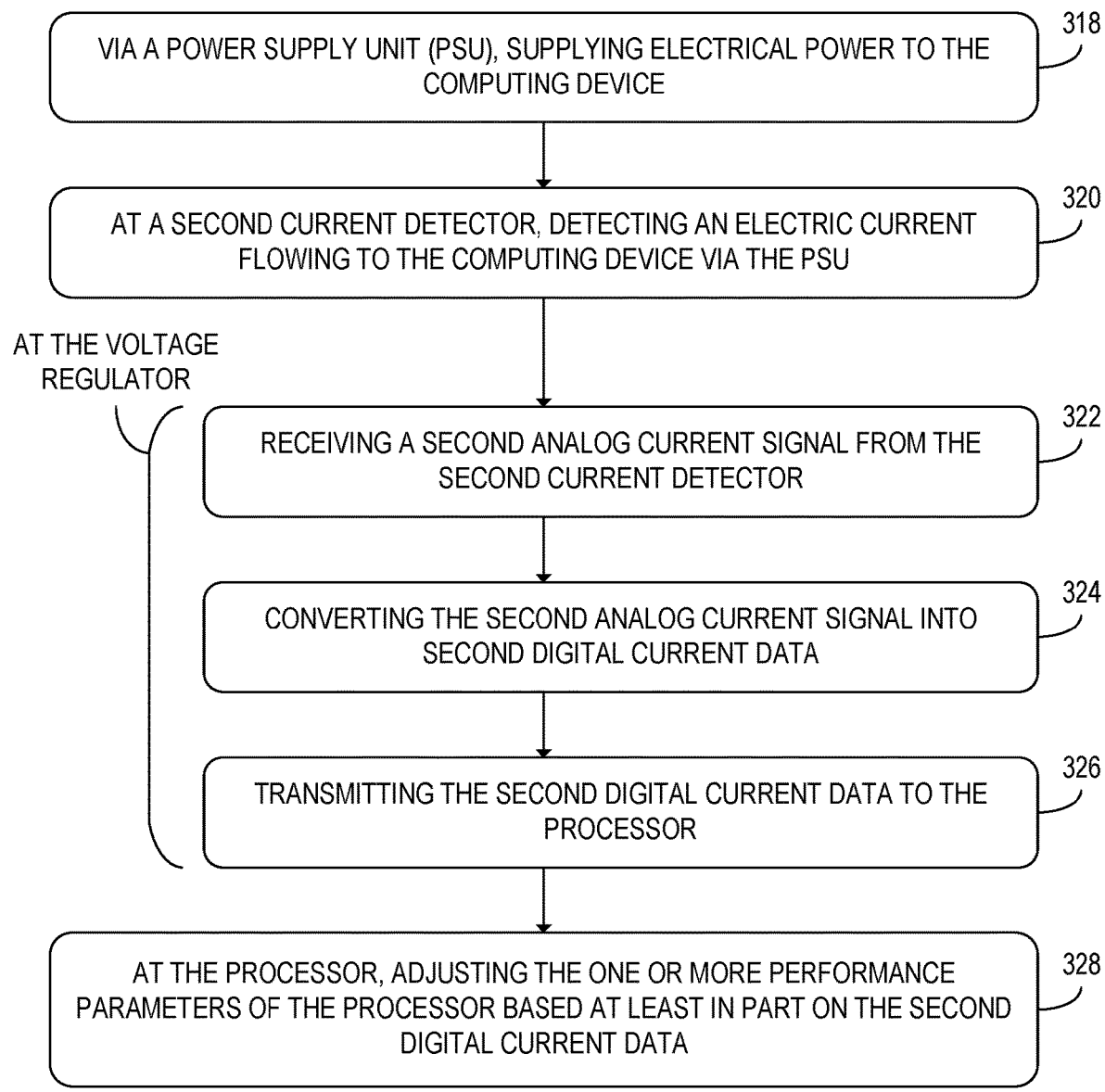
FIGS. 9B-9E show additional steps of the method of FIG. 9A that may be performed in some examples.

FIG. 9B shows additional steps of the method 300 that may be performed in some examples when the computing device includes a PSU. At step 318, the method 300 may further include, via the PSU, supplying electrical power to the computing device. The electrical power supplied to the computing device through the PSU may be received from an external power source. The PSU may transmit the electrical power to a charger that is configured to route electric current to the battery and to other components of the computing device. At step 320, the method 300 may further include, at a second current detector, detecting an electric current flowing to the computing device via the PSU. The second current detector may, for example, include a sense resistor located between the PSU and the charger.

Steps 322, 324, and 326 of the method 300 may be performed at the voltage regulator. At step 322, the method 300 may further include receiving a second analog current signal from the second current detector. At step 324, the method 300 may further include converting the second analog current signal into second digital current data at the ADC. In examples in which the voltage detector includes a deglitching circuit, the second analog current signal may be filtered at the deglitching circuit when step 324 is performed. At step 326, the method 300 may further include transmitting the second digital current data to the processor. The second digital current data may be included in the current report.

At step 328, the method 300 may further include, at the processor, adjusting the one or more performance parameters of the processor based at least in part on the second digital current data. For example, the processor may detect when the PSU starts and stops receiving electrical power from the external power source. When the computing device starts receiving electrical power from the external power source, the processor may adjust the one or more performance parameters to increase the voltage received at the processor and/or to increase the clock rate of the processor. When the computing device stops receiving electrical power from the external power source, the processor may adjust the one or more performance parameters to decrease the voltage received at the processor and/or to decrease the clock rate of the processor.

Figure 9C:
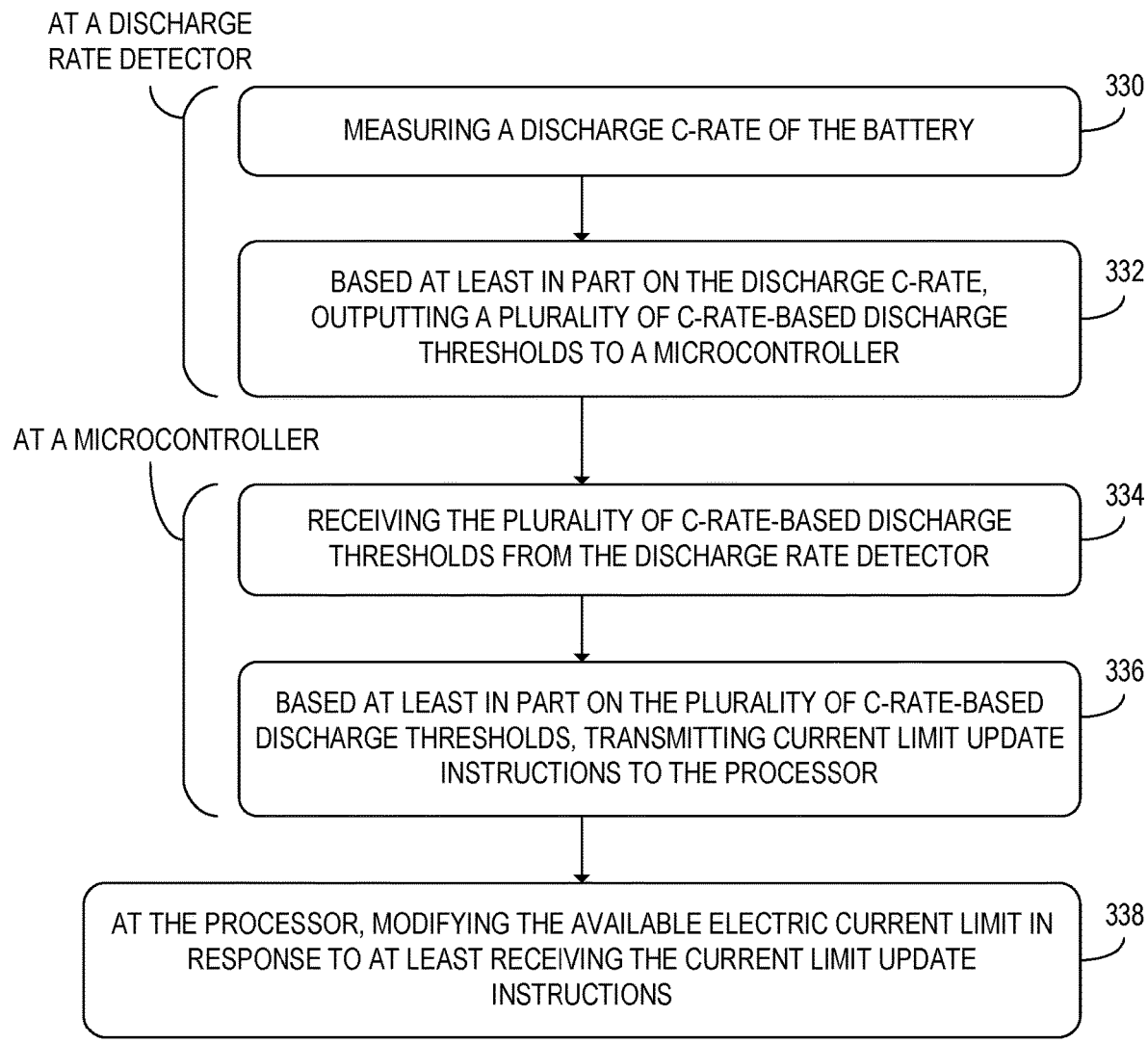

FIG. 9C shows additional steps of the method 300 that may be performed in examples in which the computing device further includes a discharge rate detector. Steps 330 and 332 may be performed at the discharge rate detector. At step 330, the method 200 may further include measuring a discharge C-rate of the battery. For example, the discharge rate detector may be configured to detect a total current output by the battery to the plurality of electronic components of the computing device to which the battery is configured to provide power. At step 332, the method 300 may further include, based at least in part on the discharge C-rate, outputting a plurality of C-rate-based discharge thresholds to a microcontroller. The plurality of C-rate-based discharge thresholds may include a maximum sustained current and a maximum peak current of the battery.

Subsequently to step 332, the method 300 may further include performing steps 334, and 336 at the microcontroller included in the computing device. At step 334, the method 300 may further include receiving the plurality of C-ratebased discharge thresholds from the discharge rate detector. Based at least in part on the plurality of C-rate-based discharge thresholds, the method 300 may further include, at step 336, transmitting current limit update instructions to the processor. For example, the current limit update instructions may indicate a current limit update schedule according to which the available electric current limit is configured to be modified over time. The microcontroller may, in such examples, be configured to generate the current limit update instructions at least in part by referring to a lookup table stored in memory that indicates respective durations at which the battery is configured to operate at a plurality of different discharge C-rates. At step 338, the method 300 may further include, at the processor, modifying the available electric current limit in response to at least receiving the current limit update instructions.

Figure 9D:
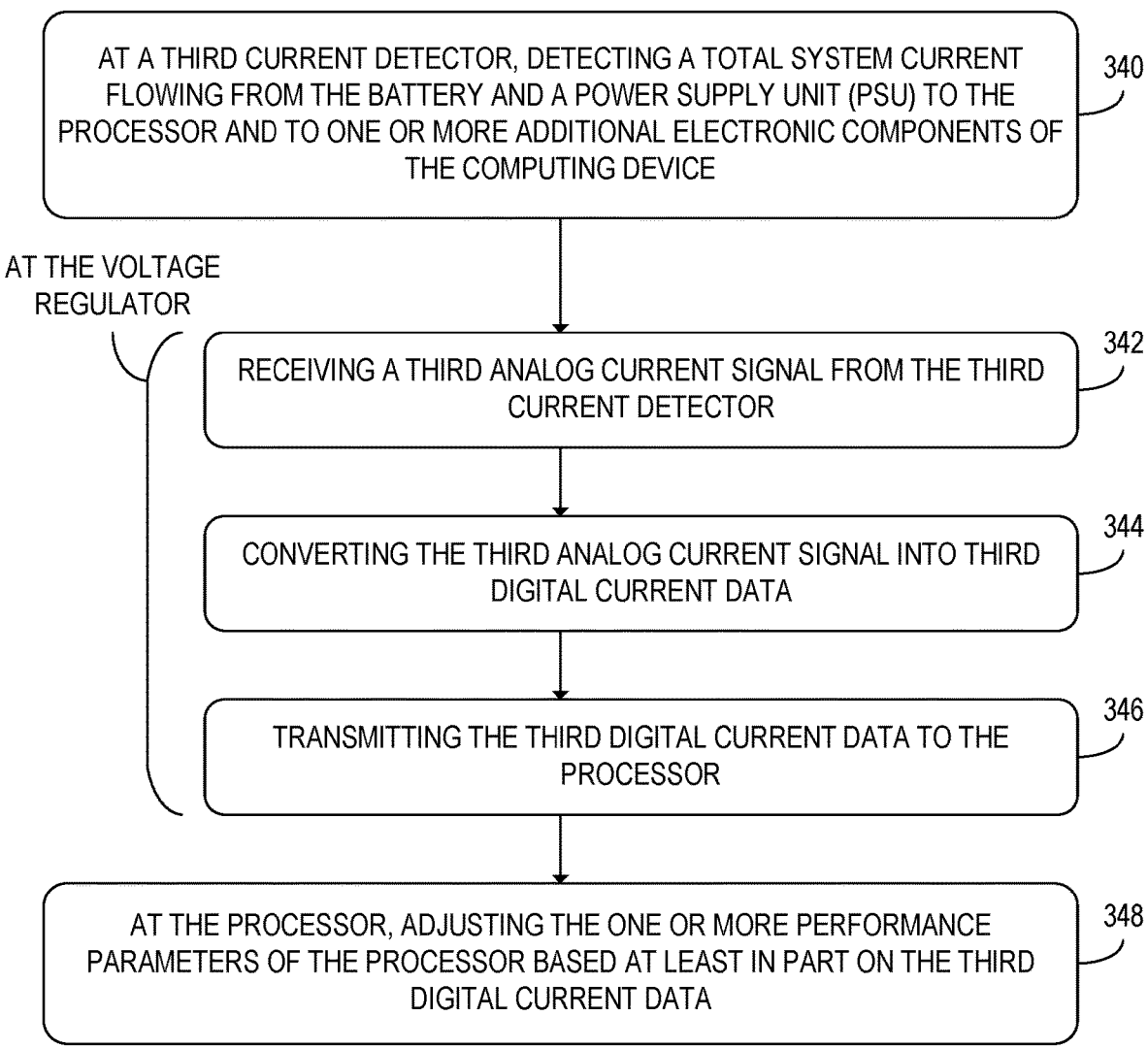

FIG. 9D shows additional steps of the method 300 that may be performed in some examples. At step 340, the method 300 may further include, at a third current detector, detecting a total system current flowing from the battery and a power supply unit (PSU) to the processor and to one or more additional electronic components of the computing device. The total system current may be the sum of the total battery discharge current and a total charger current output by the charger.

Steps 342, 344, and 346 of the method 300 may be performed at the voltage regulator. At step 342, the method 300 may further include receiving a third analog current signal from the third current detector. At step 344, the method 300 may further include converting the third analog current signal into third digital current data at the ADC. In examples in which the voltage detector includes a deglitching circuit, the third analog current signal may be filtered at the deglitching circuit when step 344 is performed. At step 346, the method 300 may further include transmitting the third digital current data to the processor.

At step 348, the method 300 may further include, at the processor, adjusting the one or more performance parameters of the processor based at least in part on the third digital current data. In some examples, adjusting the one or more performance parameters based at least in part on the third digital current data may include computing a charger current by subtracting the total battery discharge current from the total system current. The processor may, in such examples, adjust the one or more performance parameters to account for the amount of current received from the PSU via the charger. The processor may, for example, increase the one or more performance parameters when the charger current increases and decrease the one or more performance parameters when the charger current decreases.

In some examples, the computing device includes current detectors corresponding to the second current detector and the third current detector without including a first current detector that measures the electric current flowing from the battery to the processor via the voltage regulator. In such examples, the electric current flowing from the battery to the processor may be estimated at least in part by subtracting the amount of electric current measured at the second current detector from the amount of electric current measured at the second current detector.

Figure 9E:
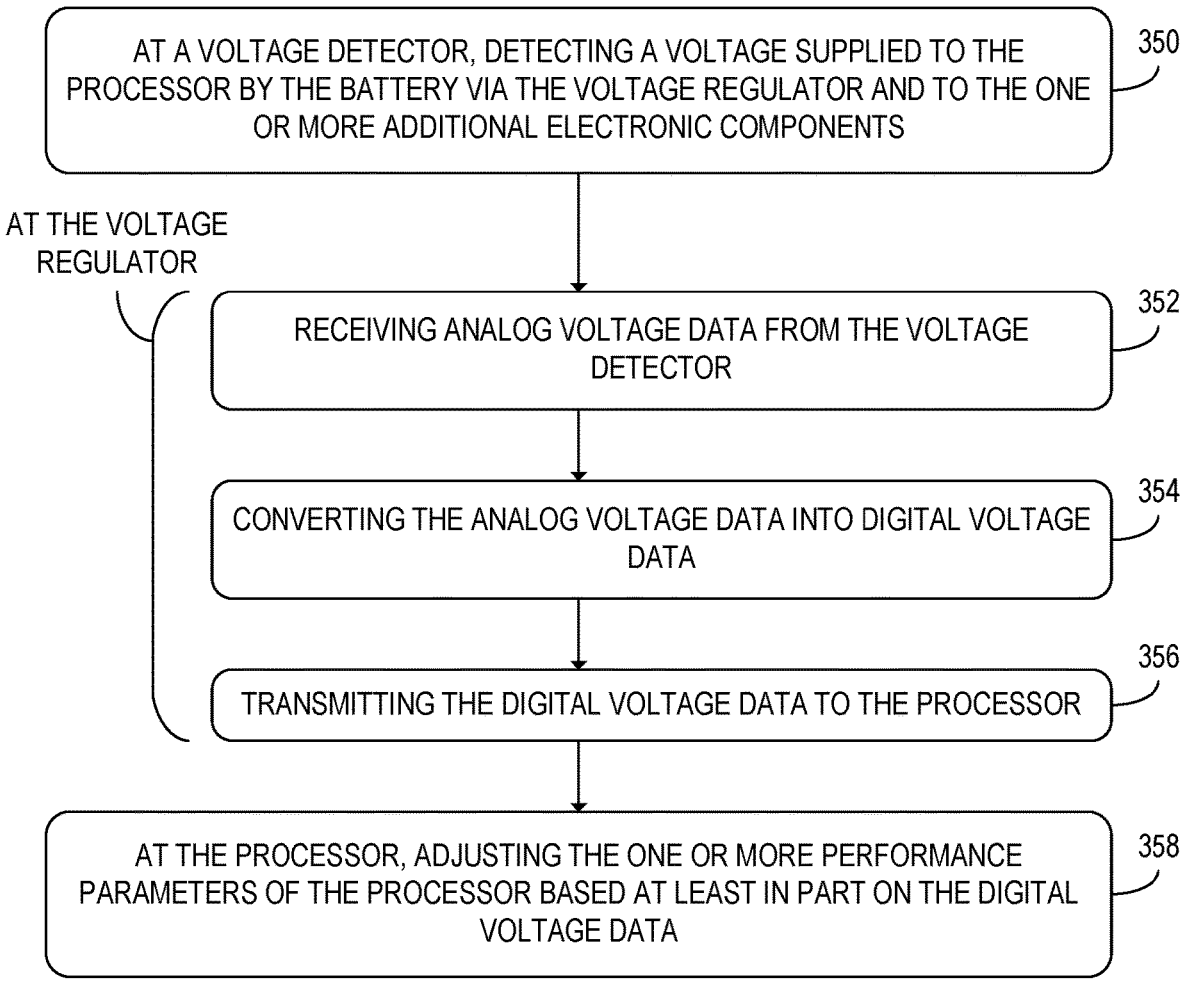

FIG. 9E shows additional steps of the method 300 that may be performed in some examples. The steps shown in FIG. 9E may be performed at the voltage regulator. At step 350, the method 300 may further include, at a voltage detector, detecting a voltage supplied to the processor by the battery via the voltage regulator and to the one or more additional electronic components. The voltage detector may be located downstream of the battery and upstream of the voltage regulator and the one or more additional electronic components.

Steps 352, 354, and 356 of the method 300 may be performed at the voltage regulator. At step 352, the method 300 may further include receiving analog voltage data from the voltage detector. At step 354, the method 300 may further include, at the ADC included in the voltage regulator, converting the analog voltage data into digital voltage data. At step 356, the method 300 may further include transmitting the digital voltage data to the processor. The digital voltage data may be transmitted to the processor in the current report along with the digital current data or in a separate signal.

At step 358, the method 300 may further include, at the processor, adjusting the one or more performance parameters of the processor based at least in part on the digital voltage data. In some examples, the digital voltage data may indicate the voltage supplied to the processor by the battery with a sampling rate higher than the rate at which the processor is configured to adjust the voltage it receives. In such examples, the processor may adjust the one or more performance parameters with increased responsiveness to changes in received voltage.

Using the devices and methods discussed above, instructions for a processor to perform processor throttling may be generated at a voltage regulator rather than at the processor itself. Thus, processor throttling may be performed more quickly in response to increases in current received at the processor from the battery and may be performed more reliably under conditions in which software malfunctions occur at the processor. The devices and methods discussed above may therefore provide the battery of the computing device with more reliable protection from current levels that would degrade battery performance. In addition, when the processor operates below the available electric current limit, the performance of the processor may be increased. The processor may thereby utilize available power more fully to allow for increased performance while preserving the performance of the battery.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
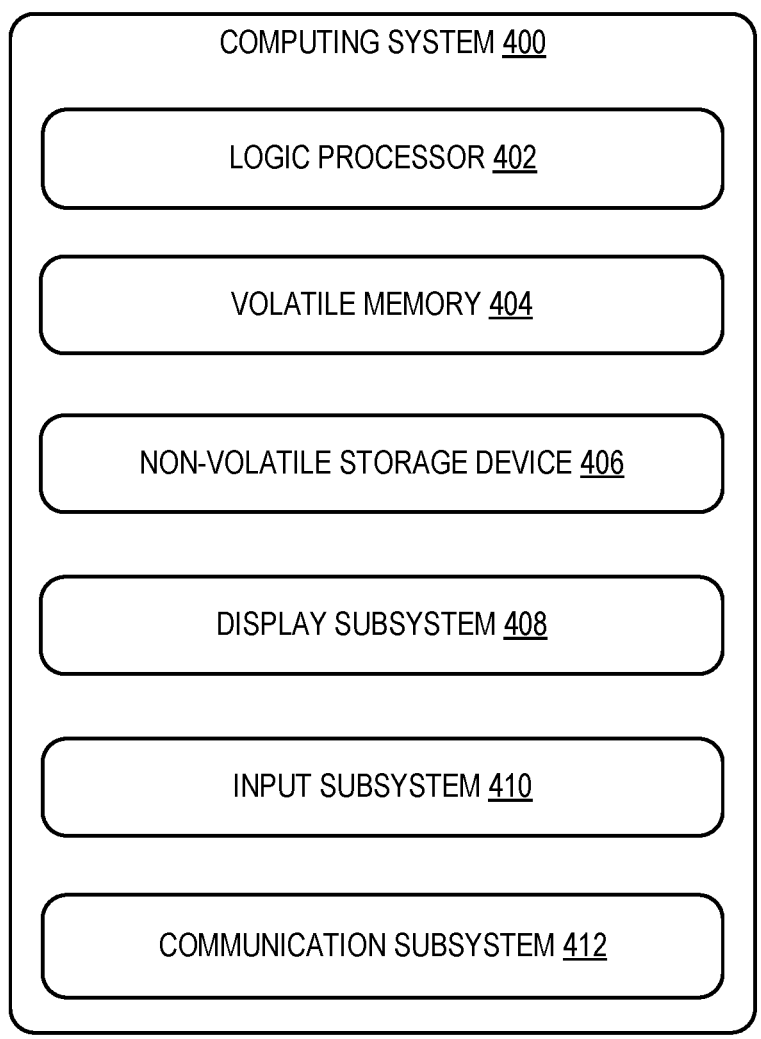
FIG. 10 shows a schematic view of an example computing environment in which the computing device of FIG. 1 may be enacted.

FIG. 10 schematically shows a non-limiting embodiment of a computing system 400 that can enact one or more of the methods and processes described above. Computing system 400 is shown in simplified form. Computing system 400 may embody the computing device 10 described above and illustrated in FIG. 1, the computing device 100 described above and illustrated in FIG. 5, or the computing device 200 described above and illustrated in FIG. 8. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 10.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing device is provided, including a battery, a processor configured to receive electrical power from the battery via a voltage regulator, one or more additional electronic components configured to receive electrical power from the battery, and a first current detector. The first current detector may be configured to detect a total battery discharge current flowing from the battery to the processor via the voltage regulator and to the one or more additional electronic components. The voltage regulator may be configured to receive a first analog current signal from the first current detector, convert the first analog current signal into first digital current data, and transmit the first digital current data to the processor. The processor may be further configured to determine a difference between the total battery discharge current, as indicated by the first digital current data, and an available electric current limit for the battery. In response to at least determining the difference between the total battery discharge current and the available electric current limit, the processor may be further configured to adjust one or more performance parameters of the processor such that the difference is reduced.

According to this aspect, the one or more performance parameters may include a voltage supplied to the processor.

According to this aspect, the one or more performance parameters may include a clock rate of the processor.

According to this aspect, the computing device may further include a power supply unit (PSU) configured to supply electrical power to the computing device. The computing device may further include a second current detector configured to detect an electric current flowing to the computing device via the PSU. The voltage regulator may be further configured to receive a second analog current signal from the second current detector, convert the second analog current signal into second digital current data, and transmit the second digital current data to the processor. The processor may be further configured to adjust the one or more performance parameters of the processor based at least in part on the second digital current data.

According to this aspect, the computing device may further include a microcontroller. The computing device may further include a discharge rate detector configured to measure a discharge C-rate of the battery, and, based at least in part on the discharge C-rate, output a plurality of C-rate-based discharge thresholds to the microcontroller. The microcontroller may be configured to receive the plurality of C-rate-based discharge thresholds from the discharge rate detector, and, based at least in part on the plurality of C-rate-based discharge thresholds, transmit current limit update instructions to the processor. The processor may be further configured to modify the available electric current limit in response to at least receiving the current limit update instructions.

According to this aspect, the plurality of C-rate-based discharge thresholds may include a maximum sustained current and a maximum peak current of the battery.

According to this aspect, the processor may be configured to adjust the one or more performance parameters at least in part by performing proportional-integral-derivative (PID) control of the one or more performance parameters.

According to this aspect, the computing device may further include a power supply unit (PSU) configured to supply electrical power to the computing device. The computing device may further include a third current detector configured to detect a total system current flowing from the battery and the PSU to the processor and to one or more additional electronic components of the computing device. The voltage regulator may be further configured to receive a third analog current signal from the third current detector, convert the third analog current signal into third digital current data, and transmit the third digital current data to the processor. The processor may be further configured to adjust the one or more performance parameters of the processor based at least in part on the third digital current data.

According to this aspect, the computing device may further include a voltage detector configured to detect a voltage supplied to the processor by the battery via the voltage regulator and to the one or more additional electronic components. The voltage regulator may be further configured to receive analog voltage data from the voltage detector, convert the analog voltage data into digital voltage data, and transmit the digital voltage data to the processor. The processor may be further configured to adjust the one or more performance parameters of the processor based at least in part on the digital voltage data.

According to this aspect, the voltage regulator may further include a deglitching circuit configured to remove, from the first analog current signal, one or more overshoot components for which the total battery discharge current is greater than or equal to the available electric current limit for less than a deglitching timer duration.

According to this aspect, the deglitching timer duration may be longer than a current spike duration for which the processor is configured to operate at a warn-level current.

According to this aspect, the deglitching timer duration may be shorter than a current spike duration for which the processor is configured to operate at a warn-level current.

According to another aspect of the present disclosure, a method for use with a computing device is provided. The method may include, at a processor, receiving electrical power from a battery via a voltage regulator. The method may further include, at one or more additional electronic components, receiving electrical power from the battery. The method may further include, at a first current detector, detecting a total battery discharge current flowing from the battery to the processor via the voltage regulator and to the one or more additional electronic components. The method may further include, at the voltage regulator, receiving a first analog current signal from the first current detector, converting the first analog current signal into first digital current data, and transmitting the first digital current data to the processor. The method may further include, at the processor, determining a difference between the total battery discharge current, as indicated by the first digital current data, and an available electric current limit for the battery. In response to at least determining the difference between the total battery discharge current and the available electric current limit, the method may further include adjusting one or more performance parameters of the processor such that the difference is reduced.

According to this aspect, the one or more performance parameters are selected from the group comprising a voltage supplied to the processor and a clock rate of the processor.

According to this aspect, the method may further include, via a power supply unit (PSU), supplying electrical power to the computing device. The method may further include, at a second current detector, detecting an electric current flowing to the computing device via the PSU. The method may further include, at the voltage regulator, receiving a second analog current signal from the second current detector, converting the second analog current signal into second digital current data, and transmitting the second digital current data to the processor. The method may further include, at the processor, adjusting the one or more performance parameters of the processor based at least in part on the second digital current data.

According to this aspect, the method may further include, at a discharge rate detector, measuring a discharge C-rate of the battery. The method may further include, based at least in part on the discharge C-rate, outputting a plurality of C-rate-based discharge thresholds to a microcontroller. The method may further include, at the microcontroller, receiving the plurality of C-rate-based discharge thresholds from the discharge rate detector, and, based at least in part on the plurality of C-rate-based discharge thresholds, transmitting current limit update instructions to the processor. The method may further include, at the processor, modifying the available electric current limit in response to at least receiving the current limit update instructions.

According to this aspect, the method may further include, at a third current detector, detecting a total system current flowing from the battery and a power supply unit (PSU) to the processor and to one or more additional electronic components of the computing device. The method may further include, at the voltage regulator, receiving a third analog current signal from the third current detector, converting the third analog current signal into third digital current data, and transmitting the third digital current data to the processor. The method may further include, at the processor, adjusting the one or more performance parameters of the processor based at least in part on the third digital current data.

According to this aspect, the method may further include, at a voltage detector, detecting a voltage supplied to the processor by the battery via the voltage regulator and to the one or more additional electronic components. The method may further include, at the voltage regulator, receiving analog voltage data from the voltage detector, converting the analog voltage data into digital voltage data, and transmitting the digital voltage data to the processor. The method may further include, at the processor, adjusting the one or more performance parameters of the processor based at least in part on the digital voltage data.

According to this aspect, the method may further include, at a deglitching circuit included in the voltage regulator, removing, from the first analog current signal, one or more overshoot components that indicate for which the total battery discharge current is greater than or equal to the available electric current limit for less than a deglitching timer duration.

According to another aspect of the present disclosure, a computing device is provided, including a battery, a power supply unit (PSU) configured to supply electrical power to the computing device, a processor configured to receive electrical power from the battery and the PSU via a voltage regulator, one or more additional electronic components configured to receive electrical power from the battery and the PSU, and a current detector. The current detector may be configured to detect a total system current flowing from the battery and the PSU to the processor and to one or more additional electronic components of the computing device. The computing device may further include an additional current detector configured to detect an electric current flowing from the PSU to the computing device. The voltage regulator may be configured to receive an analog current signal from the current detector and additional analog current signal from the additional current detector. The voltage regulator may be further configured to convert the analog current signal into digital current data and the additional analog current signal into additional digital current data. The voltage regulator may be further configured to transmit the digital current data and the additional digital current data to the processor. The processor may be further configured to, based at least in part on the digital current data, determine a total battery discharge current flowing from the battery to the processor and to the one or more additional electronic components. The processor may be further configured to determine a difference between the total battery discharge current and an available electric current limit of the battery. In response to at least determining the difference between the total battery discharge current and the available electric current limit, the processor may be further configured to adjust one or more performance parameters of the processor such that the difference is reduced.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a battery;
a processor configured to receive electrical power from the battery via a voltage regulator;
one or more additional electronic components configured to receive electrical power from the battery;
a first current detector configured to detect a total battery discharge current flowing from the battery to the processor via the voltage regulator and to the one or more additional electronic components, wherein the voltage regulator further includes a deglitching circuit;
wherein the voltage regulator is configured to:
receive a first analog current signal from the first current detector;
at the deglitching circuit, remove, from the first analog current signal, one or more overshoot components for which the total battery discharge current is greater than or equal to an available electric current limit for less than a deglitching timer duration, wherein the deglitching timer duration is longer than a current spike duration for which the processor is configured to operate at a warn-level current;
convert the first analog current signal, with overshoot components removed, into first digital current data; and
transmit the first digital current data to the processor, wherein the processor is further configured to:
determine a difference between the total battery discharge current, as indicated by the first digital current data, and the available electric current limit for the battery; and
in response to at least determining the difference between the total battery discharge current and the available electric current limit, adjust one or more performance parameters of the processor such that the difference is reduced.

2. The computing device of claim 1, wherein the one or more performance parameters include a voltage supplied to the processor.

3. The computing device of claim 1, wherein the one or more performance parameters include a clock rate of the processor.

4. The computing device of claim 1, further comprising:
a power supply unit (PSU) configured to supply electrical power to the computing device; and a second current detector configured to detect an electric current flowing to the computing device via the PSU, wherein:
the voltage regulator is further configured to:
receive a second analog current signal from the second current detector;
convert the second analog current signal into second digital current data; and
transmit the second digital current data to the processor,
the processor is further configured to adjust the one or more performance parameters of the processor based at least in part on the second digital current data.

5. The computing device of claim 1, wherein the processor is configured to adjust the one or more performance parameters at least in part by performing proportional-integral-derivative (PID) control of the one or more performance parameters.

6. The computing device of claim 1, further comprising:
a power supply unit (PSU) configured to supply electrical power to the computing device; and
a third current detector configured to detect a total system current flowing from the battery and the PSU to the processor and to one or more additional electronic components of the computing device, wherein:
the voltage regulator is further configured to:
receive a third analog current signal from the third current detector;
convert the third analog current signal into third digital current data; and
transmit the third digital current data to the processor; and
the processor is further configured to adjust the one or more performance parameters of the processor based at least in part on the third digital current data.

7. The computing device of claim 1, further comprising a voltage detector configured to detect a voltage supplied to the processor by the battery via the voltage regulator and to the one or more additional electronic components, wherein:
the voltage regulator is further configured to:
receive analog voltage data from the voltage detector;
convert the analog voltage data into digital voltage data; and
transmit the digital voltage data to the processor; and
the processor is further configured to adjust the one or more performance parameters of the processor based at least in part on the digital voltage data.

8. The computing device of claim 1, wherein the deglitching circuit is further configured to:
determine that the first analog current signal overshoots the available electric current limit by an amount greater than an overshoot indication reset threshold; and
output an overshoot indication to the processor in response to determining that the first analog current signal overshoots the available electric current limit by the amount greater than an overshoot indication reset threshold.

9. The computing device of claim 1, wherein:
the deglitching circuit is further configured to:
determine that the first analog current signal overshoots the warn-level current for an amount of time greater than the deglitching timer duration; and
in response to determining that first analog current signal overshoots the warn-level current for the amount of time greater than the deglitching timer duration, output an overshoot indication to the processor; and the processor is further configured to adjust the one or more performance parameters in response to receiving the overshoot indication.

10. The computing device of claim 1, wherein the processor is configured to separately adjust the one or more performance parameters of a plurality of processor threads.

11. A method for use with a computing device, the method comprising:
at a processor, receiving electrical power from a battery via a voltage regulator;
at one or more additional electronic components, receiving electrical power from the battery;
at a first current detector, detecting a total battery discharge current flowing from the battery to the processor via the voltage regulator and to the one or more additional electronic components;
at the voltage regulator:
receiving a first analog current signal from the first current detector;
at a deglitching circuit included in the voltage regulator, removing, from the first analog current signal, one or more overshoot components for which the total battery discharge current is greater than or equal to an available electric current limit for less than a deglitching timer duration, wherein the deglitching timer duration is longer than a current spike duration for which the processor is configured to operate at a warn-level current;
converting the first analog current signal, with overshoot components removed, into first digital current data; and
transmitting the first digital current data to the processor; and
at the processor:
determining a difference between the total battery discharge current, as indicated by the first digital current data, and the available electric current limit for the battery; and
in response to at least determining the difference between the total battery discharge current and the available electric current limit, adjusting one or more performance parameters of the processor such that the difference is reduced.

12. The method of claim 11, wherein the one or more performance parameters include a voltage supplied to the processor.

13. The method of claim 11, wherein the one or more performance parameters include a clock rate of the processor.

14. The method of claim 11, further comprising:
via a power supply unit (PSU), supplying electrical power to the computing device;
at a second current detector, detecting an electric current flowing to the computing device via the PSU;
at the voltage regulator:
receiving a second analog current signal from the second current detector;
converting the second analog current signal into second digital current data; and
transmitting the second digital current data to the processor; and
at the processor, adjusting the one or more performance parameters of the processor based at least in part on the second digital current data.

15. The method of claim 11, wherein adjusting the one or more performance parameters includes performing proportional-integral-derivative (PID) control of the one or more performance parameters.

16. The method of claim 11, further comprising:
via a power supply unit (PSU), supplying electrical power to the computing device;
at a third current detector, detecting a total system current flowing from the battery and the PSU to the processor and to one or more additional electronic components of the computing device;
at the voltage regulator:
receiving a third analog current signal from the third current detector;
converting the third analog current signal into third digital current data; and
transmitting the third digital current data to the processor; and
at the processor, adjusting the one or more performance parameters of the processor based at least in part on the third digital current data.

17. The method of claim 11, further comprising:
at a voltage detector, detect a voltage supplied to the processor by the battery via the voltage regulator and to the one or more additional electronic components;
via the voltage regulator:
receive analog voltage data from the voltage detector;
convert the analog voltage data into digital voltage data; and
transmit the digital voltage data to the processor; and
at the processor, adjusting the one or more performance parameters of the processor based at least in part on the digital voltage data.

18. The method of claim 11, further comprising, at the deglitching circuit:
determining that the first analog current signal overshoots the available electric current limit by an amount greater than an overshoot indication reset threshold; and
outputting an overshoot indication to the processor in response to determining that the first analog current signal overshoots the available electric current limit by the amount greater than an overshoot indication reset threshold.

19. The method of claim 11, further comprising:
at the deglitching circuit:
determining that the first analog current signal overshoots the warn-level current for an amount of time greater than the deglitching timer duration; and
in response to determining that first analog current signal overshoots the warn-level current for the amount of time greater than the deglitching timer duration, outputting an overshoot indication to the processor; and
at the processor, adjusting the one or more performance parameters in response to receiving the overshoot indication.

20. A computing device comprising:
a battery;
a processor configured to receive electrical power from the battery via a voltage regulator;
one or more additional electronic components configured to receive electrical power from the battery;
a first current detector configured to detect a total battery discharge current flowing from the battery to the processor via the voltage regulator and to the one or more additional electronic components,
wherein the voltage regulator further includes a deglitching circuit;
wherein the voltage regulator is configured to:
receive a first analog current signal from the first current detector;
at the deglitching circuit, remove, from the first analog current signal, one or more overshoot components for which the total battery discharge current is greater than or equal to an available electric current limit for less than a deglitching timer duration, wherein the deglitching timer duration is shorter than a current spike duration for which the processor is configured to operate at a warn-level current;
convert the first analog current signal, with overshoot components removed, into first digital current data; and
transmit the first digital current data to the processor,
wherein the processor is further configured to:
determine a difference between the total battery discharge current, as indicated by the first digital current data, and the available electric current limit for the battery; and
in response to at least determining the difference between the total battery discharge current and the available electric current limit, adjust one or more performance parameters of the processor such that the difference is reduced.

* * * * *